United States Patent [19]

Ohtani et al.

[11] Patent Number: 5,929,939
[45] Date of Patent: Jul. 27, 1999

[54] CORRELATION DEGREE OPERATION APPARATUS, PARALLEL CORRELATION DEGREE OPERATION APPARATUS AND CORRELATION DEGREE OPERATION METHOD

[75] Inventors: Akihiko Ohtani; Yoshifumi Matsumoto; Akira Sota, all of Osaka; Katsuji Aoki, Kanagawa; Hisato Yoshida; Masahiro Gion, both of Osaka; Atsushi Ubukata, Kyoto, all of Japan

[73] Assignee: Matsushita Electric Industrial Co., Ltd., Osaka, Japan

[21] Appl. No.: 08/634,490

[22] Filed: Apr. 18, 1996

[30] Foreign Application Priority Data

Apr. 18, 1995 [JP] Japan .................................. 7-092096

[51] Int. Cl.⁶ ...................................................... H04N 7/28
[52] U.S. Cl. .......................... 348/699; 348/721; 348/420
[58] Field of Search ..................... 348/699, 700, 348/420, 421, 416, 405, 419, 719, 720, 721; 395/480; H04N 7/28

[56] References Cited

U.S. PATENT DOCUMENTS

| | | | |
|---|---|---|---|
| 5,126,845 | 6/1992 | Yamashita | 348/721 |
| 5,453,791 | 9/1995 | Ohki | 348/416 |
| 5,485,214 | 1/1996 | Lin et al. | 348/416 |
| 5,510,857 | 4/1996 | Kopet et al. | 348/499 |
| 5,512,962 | 4/1996 | Homma | 348/699 |
| 5,555,033 | 9/1996 | Bazzaz | 348/699 |
| 5,604,546 | 2/1997 | Iwata | 348/699 |

FOREIGN PATENT DOCUMENTS

| | | |
|---|---|---|
| 5-328332 | 12/1993 | Japan . |
| 6-141304 | 5/1994 | Japan . |
| 6-165166 | 6/1994 | Japan . |
| 6-225287 | 8/1994 | Japan . |
| 6-290262 | 10/1994 | Japan . |
| 6-292178 | 10/1994 | Japan . |
| 6-303590 | 10/1994 | Japan . |
| 7-23350 | 1/1995 | Japan . |
| 7-288818 | 10/1995 | Japan . |

OTHER PUBLICATIONS

H. Nishikawa et al., "A study on frame/field motion compensation for storage media", The Institute of Electronics, Information and Communication Engineers (EIECE) Spring Conference, Part 7, pp. 64, 1991.

Primary Examiner—Tommy P. Chin
Assistant Examiner—LuAnne P. Din
Attorney, Agent, or Firm—McDermott, Will & Emery

[57] ABSTRACT

There is provided a correlation degree operation apparatus in which the search area is readily extensible, in which a high-speed process can be assured even though the search area is extended, and which can be formed in a simple arrangement. The search area memory stores the picture element data of a search area including $((m \times M) \times L)$ candidate blocks. The correlation degree operation unit executes an operation of a degree of correlation between a reference picture block and each of the candidate blocks, with the use of picture element data supplied from the search area memory, this operation being executed by a pipeline process for each candidate block group composed of $(M \times L)$ candidate blocks. The search area memory has the function of supplying four picture element data at the same clock cycle. This enables the correlation degree operation unit to continuously execute the pipeline processes for the candidate block groups. It is therefore possible to continuously execute the operations of correlation degree between the reference picture block having $(M \times N)$ picture elements and $((m \times M) \times L)$ candidate blocks.

26 Claims, 19 Drawing Sheets

FIG. 10-4

CORRELATION DEGREE OPERATION APPARATUS, PARALLEL CORRELATION DEGREE OPERATION APPARATUS AND CORRELATION DEGREE OPERATION METHOD

BACKGROUND OF THE INVENTION

The present invention relates to a correlation degree operation apparatus, a parallel correlation degree operation apparatus and a correlation degree operation method each of which is effective in detecting motion vector of picture data and which is arranged to operate a degree of correlation between two types of picture data.

As a method of compressing motion picture data, there is known a method of reducing time redundancy with the use of information (motion vector) representing that a certain part in the just previous picture has moved to which place in the current picture.

As a method of extracting such motion vector, there is known a so-called block matching method in which a current frame picture (reference picture frame) is compared with the previous frame picture (candidate frame) and in which a block similar (highly correlative) to a certain block (reference picture block) of the current frame picture, is extracted from the previous frame picture, and the motion vector is then detected. This block matching method is widely used for motion compensation prediction of picture compression coding.

According to such a block matching method, there is operated a degree of correlation between one reference picture block and each of a plurality of candidate blocks of the previous frame picture, there is selected the candidate block having the highest correlation degree, and the motion vector is then detected. To obtain the correlation between two picture blocks, it is required to operate the picture element data of each picture block. Further, to enhance the possibility of selecting a block high in correlation degree, recent picture compression technology tends to widen the search area to increase the number of candidate blocks. Thus, there is increasingly needed a correlation degree operation apparatus capable of operating, at high speed, a degree of correlation between two picture blocks.

As a correlation degree operation apparatus of prior art, there is known the type in which a plurality of operation devices each for operating a correlation degree are concurrently operated to achieve a high-speed process.

For example, the correlation degree operation apparatus disclosed by Japanese Patent Laid-Open Publication No. 6-451304 has the following arrangement. When the size of a reference picture block is equal to (M×N) picture elements and the number of candidate blocks is also equal to (M×N), there are disposed, in an M×N matrix, (M×N) operation units comprising picture element value storage registers, multiplexers and differential absolute value operation devices, the output data lines of the operation units are pipeline-connected to one another through adders, and the picture element data of a reference picture block and candidate blocks are supplied to the differential absolute value operation devices in a predetermined order. It is therefore possible to successively supply, per each clock cycle, the sum of differential absolute values representing an evaluation index of correlation degree. This achieves a high-speed operation of correlation degree.

However, the correlation degree operation apparatus of prior art has the following problems.

In this correlation degree operation apparatus, there can be operated degrees of correlation of only (M×N) candidate blocks with respect to a reference picture block having (M×N) picture elements. This makes it very difficult to increase the number of candidate blocks by extending the search area in order to enhance the possibility of selecting a candidate block high in correlation degree.

When compressing pictures according to the MPEG which is the international standards for picture compression, to assure a high picture quality with a reduced amount of codes, the search area is extended to provide, for example, 32×32 or 48×48 candidate blocks for a reference picture block having 16×16 picture elements. Accordingly, it is inevitable to provide a correlation degree operation apparatus which assures a high-speed process even though the search area is extended and which is small in circuit area.

SUMMARY OF THE INVENTION

It is an object of the present invention to provide a correlation degree operation apparatus in which the search area is readily extensible, in which a high-speed process can be assured even though the search area is extended, and which is formed in a simple arrangement.

To achieve the object above-mentioned, the present invention provides a correlation degree operation apparatus for operating, according to a block matching method, a degree of correlation between a reference picture block having (M×N) picture elements and each of ((m×M)×L) candidate blocks (in which each of M, N, L, m is a natural number, L is not less than N and m is not less than 2), and this apparatus is arranged such that an operation of correlation degree is executed by a pipeline process for each candidate block group composed of (M×L) candidate blocks and that there are used, at the same clock cycle in the pipeline process, both the picture element data required for an operation of correlation degree for one candidate block group and the picture element data required for an operation of correlation degree for another candidate block group to be executed subsequently to the first-mentioned operation for the one candidate block group.

In the correlation degree operation apparatus having the arrangement above-mentioned, the pipeline processes for the candidate block groups can continuously be executed and the correlation degrees between a reference picture block having (M×N) picture elements and the ((m×M)×L) candidate blocks can successively be supplied per clock cycle.

More specifically, the correlation degree operation apparatus preferably comprises: a main control unit for generating and supplying a memory control signal and an operation control signal based on a given clock; a search area memory which stores the picture element data of a search area including ((m×M)×L) candidate blocks, and which is arranged to supply stored picture element data according to the instruction of the memory control signal supplied from the main control unit; a correlation degree operation unit for holding the picture element data of a reference picture block having (M×N) picture elements and executing an operation of a degree of correlation between the reference picture block and each of the candidate blocks, with the use of the held picture element data of the reference picture block and the picture element data supplied from the search area memory, the operation being executed by a pipeline process for each candidate block group composed of (M×L) candidate blocks; and an operation control unit for controlling the correlation degree operation unit according to the instruction of the operation control signal supplied from the main control unit, the search area memory having the function of supplying, to the correlation degree operation unit at the same clock cycle, both the picture element data required for an operation of correlation degree for one candidate block group and the picture element data required for an operation of correlation degree for another candidate block group to be executed subsequently to the first-mentioned operation for the one candidate block group.

According to the arrangement above-mentioned, in the correlation degree operation unit, the operations for the candidate block groups can continuously be executed and the correlation degrees between a reference picture block having (M×N) picture elements and ((m×M)×L) candidate blocks can successively be supplied per clock cycle.

Preferably, the search area memory comprises: (m+1) memory element portions which respectively store the picture element data of (m+1) partial search areas obtained by dividing, per (M×(L+N−1)) picture elements, the search area having ((m+1)×M−1) columns and (L+N−1) rows and including ((m×M)×L) candidate blocks, and which are arranged to read out picture element data according to the access instruction of the memory control signal supplied from the main control unit; and timing adjust means for adjusting, in timing, picture element data read out from the (m+1) memory element portions and supplying the picture element data to the correlation degree operation unit.

According to the arrangement above-mentioned, a plurality of picture element data required for the correlation degree operation unit can readily be supplied from the search area memory. Further, the timing adjust means can readily be formed by selectors and delay means. This enables the search area memory to be formed by a circuit small in area.

Preferably, the correlation degree operation unit comprises N line operation units each comprising: two first selectors each for selecting and supplying one picture element data out of the four picture element data supplied from the search area memory, the two selected and supplied picture element data being different from each other; and M picture element operation portions each of which holds each of the picture element data of a reference picture block, which selects one picture element data out of the two picture element data selectively supplied by the two first selectors and which operates an evaluation value of correlation between the selected one picture element data and the held picture element data.

According to the arrangement above-mentioned, even though the search area is extended, picture element data are supplied to the picture element operation portions per clock cycle, thus achieving a high-speed process. Further, the correlation degree operation unit can be formed by merely disposing a plurality of line operation units having the same arrangement. This simplifies the correlation degree operation apparatus in arrangement.

Preferably, in each of the line operation units, the M picture element operation portions are symmetrically disposed in two lines at both sides of buses for transferring the picture element data selected and supplied by the first selectors.

This shortens the lengths of the wiring lines within each of the line operation units and among the line operation units.

Preferably, the correlation degree operation unit comprises N line operation units each for holding M picture element data on each row of a reference picture block and operating evaluation values of correlation between the held picture element data and the picture element data supplied from the search area memory, and the operation control unit comprises N line control units for respectively controlling the N line operation units.

According to the arrangement above-mentioned, the correlation degree operation unit and the operation control unit are formed by merely disposing the line operation units and the line control units combined therewith. This simplifies the correlation degree operation apparatus in arrangement.

Preferably, the correlation degree operation unit comprises (M×N) picture element operation portions each for holding each of the picture element data of a reference picture block, selecting one picture element data out of the four picture element data supplied from the search are memory, and operating an evaluation value of correlation between the selected one picture element data and the held picture element data.

According to the arrangement above-mentioned, even though the search area is extended, picture element data are supplied to the picture element operation portions per clock cycle. This achieves a high-speed process. Further, the correlation degree operation unit can be formed by merely disposing a plurality of line operation units having the same arrangement. This simplifies the correlation degree operation apparatus in arrangement.

BRIEF DESCRIPTION OF THE DRAWINGS

FIGS. 10-1 to 10-4 are views illustrating the operation of the correlation degree operation apparatus according to the first embodiment of the present invention, in which FIG. 10-1(a) shows the operation of the main control unit, FIG. 10-1(b) shows the picture element data read from the memory element portions, FIG. 10-3(c) shows picture element data supplied from the search area and FIG. 10-3(d) shows the buses selected by the first selectors in the correlation degree operation unit;

DETAILED DESCRIPTION OF THE INVENTION (First Embodiment)

The following description will discuss a correlation degree operation apparatus according to a first embodiment of the present invention with reference to attached drawings.

The first embodiment is arranged such that, when obtaining motion vector by whole search according to a block matching method, there is obtained a degree of correlation between a reference picture block having (M×N) picture elements and each of ((m×M)×L) candidate blocks. At this time, the size of the search area is equal to ((m+1)×M−1)×(L+N−1) picture elements. Here, each of M, N, L, m is an optional natural number (provided that L≧N and m≧2).

For the sake of explanation, it is now supposed that M is equal to 4, each of N and L is equal to 3 and m is equal to 2; that is, the size of the reference picture block is equal to 4×3 picture elements and the number of candidate blocks is equal to (2×4)×3. It is also supposed that there is obtained, as an evaluation index of correlation degree, the sum of differential absolute values in picture element between the reference picture block and the candidate blocks.

Figure 1:
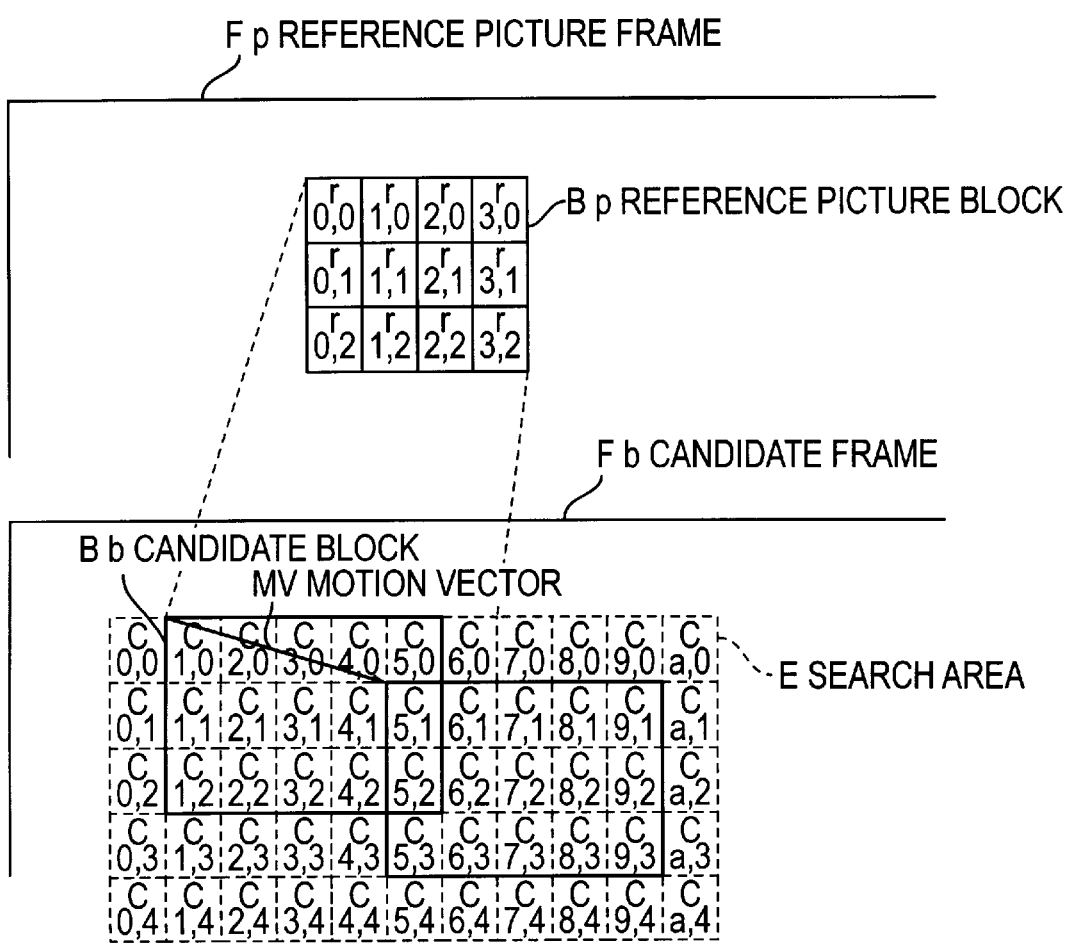
FIG. 1 is a view of a reference picture block, candidate blocks and a search area for illustrating a block matching method and motion vector.

FIG. 1 is a view illustrating a block matching method and motion vector. Shown in FIG. 1 are a reference picture frame Fp (current picture), a reference picture block Bp, a candidate frame Fb (just previous picture), a candidate block Bb, a search area E and motion vector MV. The reference picture block Bp has picture elements r and there are picture elements C in the search area E.

The motion vector refers to information representing that a certain part of the just previous picture has moved to which place in the current picture. According to the block matching method, the candidate block Bb having the highest degree of correlation with respect to the reference picture block Bp, is detected from the search area E, and the vector representing the positional shift therebetween, is referred to as motion vector. According to the first embodiment, there is obtained the candidate block Bb in which the sum of differential absolute values serving as the evaluation index of correlation degree is minimized, and the motion vector MV is then detected.

The following description will schematically discuss the operation and arrangement of the correlation degree operation apparatus according to the first embodiment.

Each of the operation portions for calculating the evaluation index of correlation degree, first holds each picture element of a reference picture block, and then receives each picture element of each candidate block at each clock cycle. Then, each of the operation portions operates a differential absolute value between the held picture element data of the reference picture block and the entered picture element data of the candidate block, and then adds the differential absolute value thus operated to the differential absolute value supplied from the previous-stage operation portion. Then, the addition result is supplied to the subsequent-stage operation portion. More specifically, the operation portions are disposed in the form of a so-called cascade connection.

The correlation degree operation apparatus according to the first embodiment is characterized in (i) the candidate block search order, (ii) means for supplying data to the operation portions in order to achieve this search order, (iii) means for controlling the data supply means, and (iv) the layout of the respective means.

Figures 1, 10:
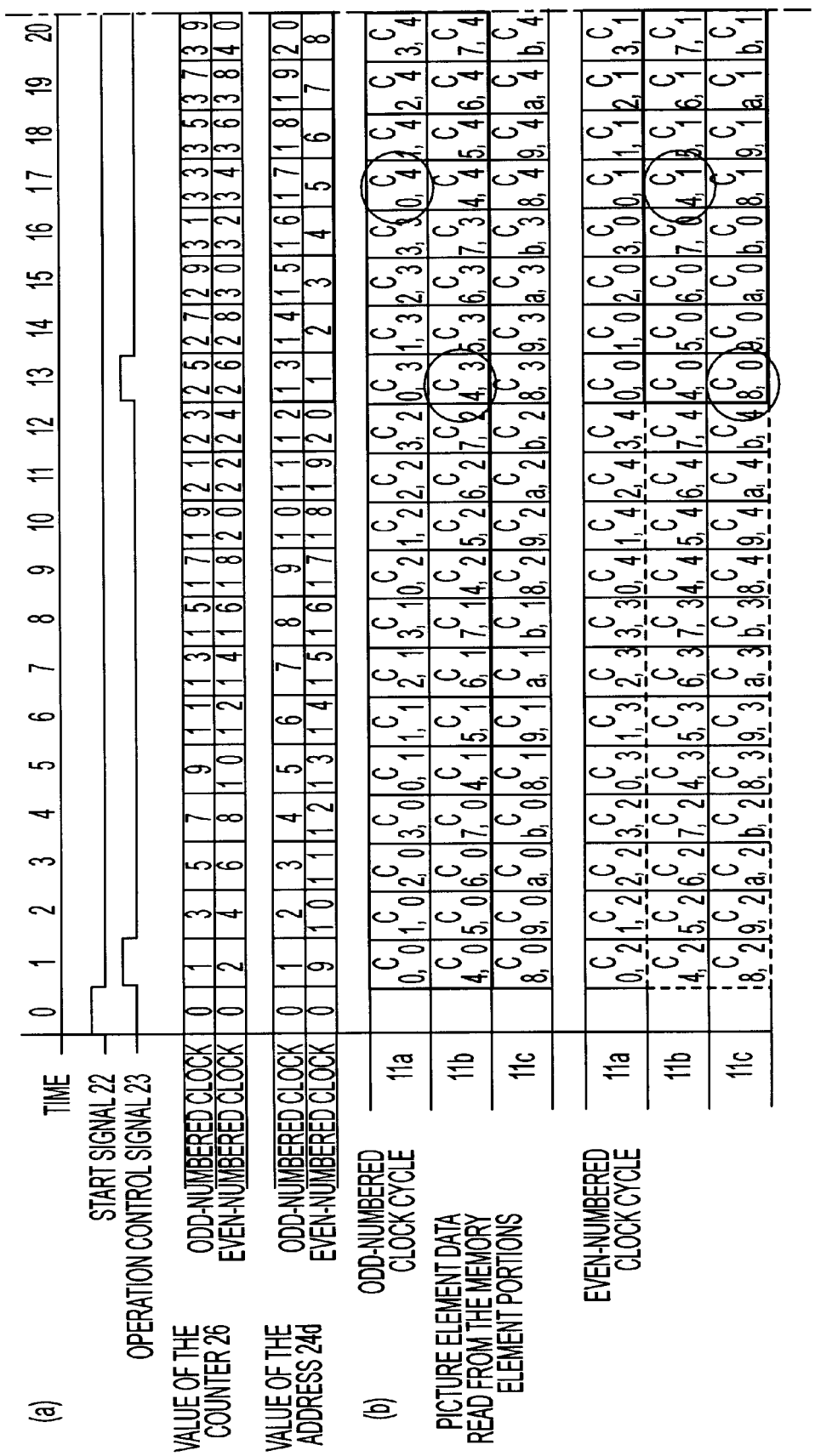
Figures 2, 10:
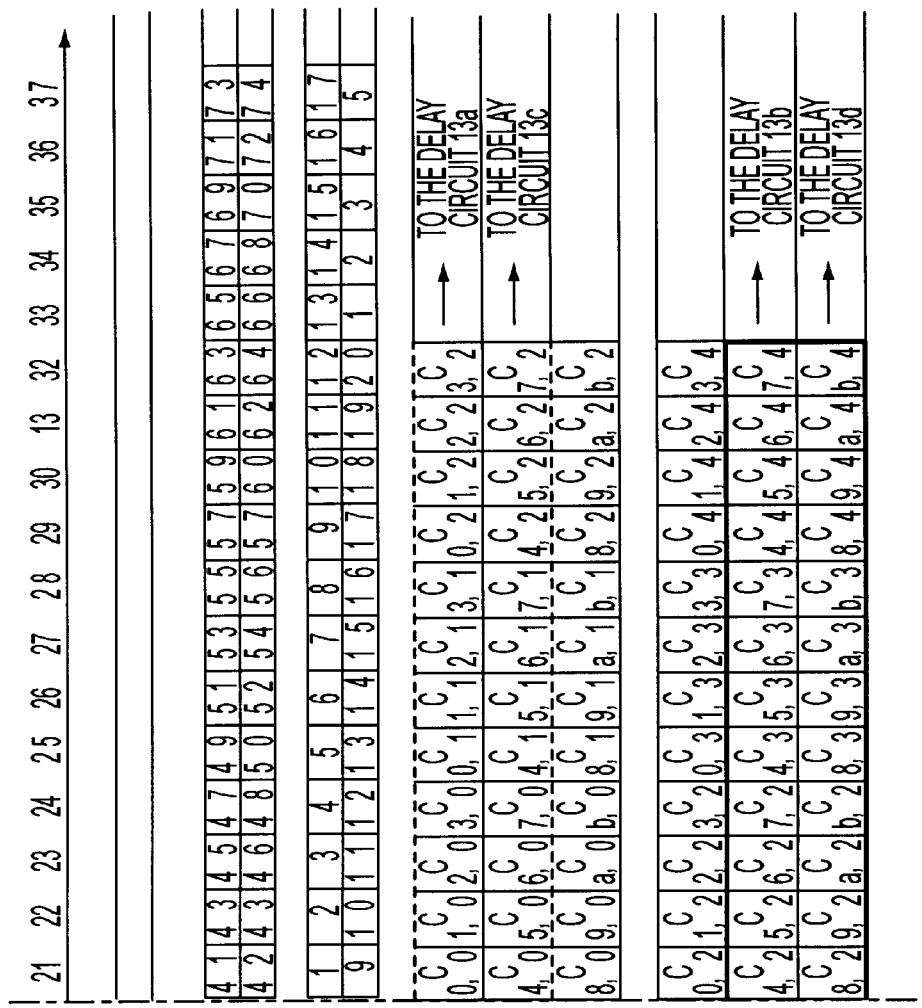
Figures 3, 10:
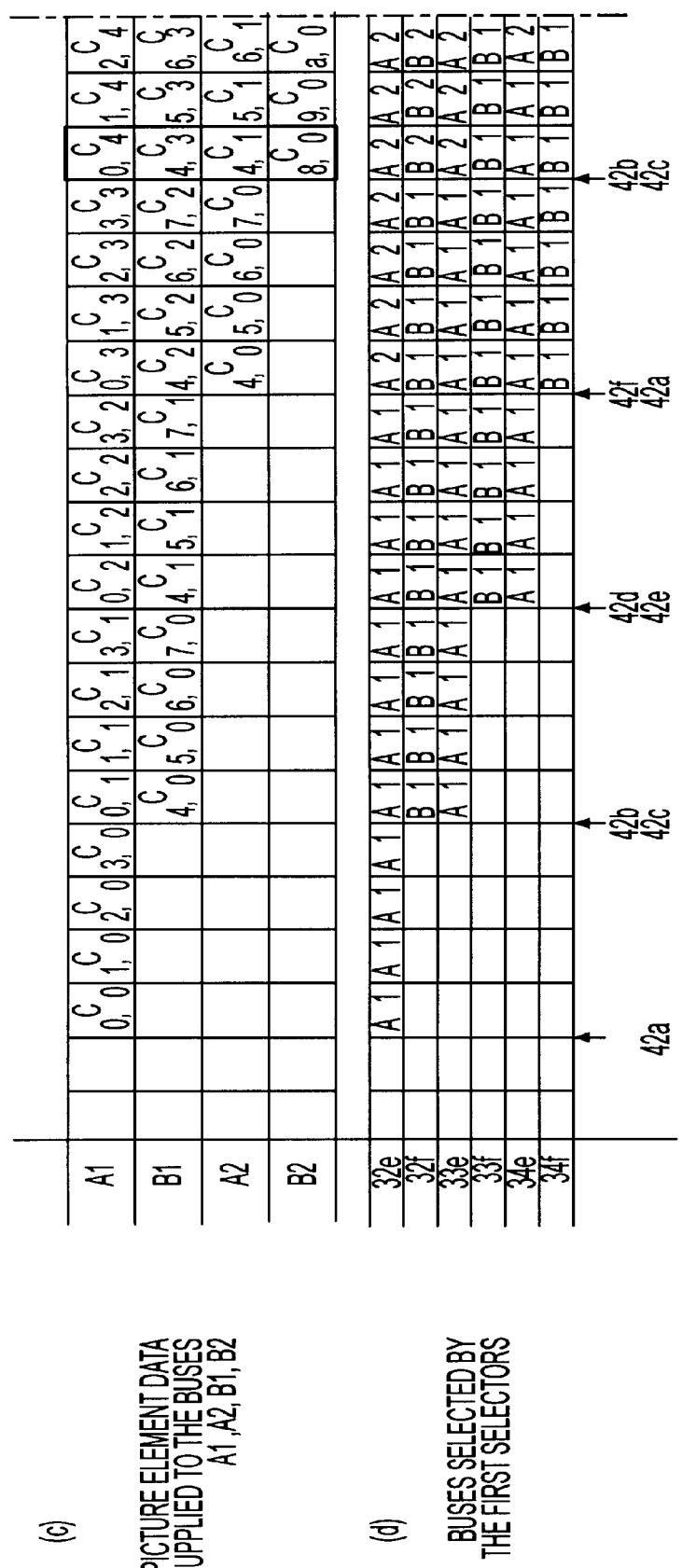

FIG. 2(*a*) is a view illustrating the range of each candidate block Bb in the search area E. For example, the candidate block Bb 0,0 is located in the upper left corner of the search area E and composed of picture elements C0,0~C3,0, C0,1~C3,1, C0,2~C3,2. The candidate block Bb 7,2 is located in the lower right corner of the search area E and composed of picture elements C7,2~Ca,2, C7,3~Ca,3, C7,4~Ca,4. Thus, the search area E having 11×5 picture elements is formed by 8×3 candidate blocks Bb.

Each of FIG. 2(*b*) and FIG. 2(*c*) shows the candidate block Bb search order in the first embodiment. In each of FIG. 2(*b*) and FIG. 2(*c*), the picture element at the upper left corner of each candidate block Bb serves as a representative point of each candidate block Bb, and the arrow following the motion of the representative point shows the candidate block Bb search order.

As shown in FIG. 2(*b*), starting with the upper left candidate block Bb 0,0 in the search area E, four (=M) candidate blocks Bb 0,0, Bb 1,0, Bb 2,0, Bb 3,0 are horizontally processed in this order (step 1). Then, starting with the candidate block Bb 0,1 which is vertically lowered by one row, four candidate blocks are horizontally processed. By repeating the process similar to that abovementioned three (=L) times (step 2), 12 (=M×L) candidate blocks Bb 0,0~Bb 3,2 are processed.

Then, as shown in FIG. 2(*c*), starting with the candidate block Bb 4,0, four (=M) candidate blocks Bb 4,0, Bb 5,0, Bb 6,0, Bb 7,0 are horizontally processed in this order. Then, starting with the candidate block Bb 4,1 which is vertically lowered by one row, four candidate blocks are horizontally processed. By repeating the process similar to that abovementioned three (=L) times, 12 (=M×L) candidate blocks Bb 4,0~Bb 7,2 are processed.

When pipeline processes are executed using a correlation degree operation apparatus of prior art, the process shown in FIG. 2(*b*) and the process shown in FIG. 2(*c*) cannot continuously be executed. This results in the existence of a period of several cycles (12 cycles in the candidate blocks shown in FIG. 2) during which no correlation degree is not being operated.

According to the correlation degree operation apparatus of the first embodiment, (m×M)×L (=(4×2)×3) candidate blocks can continuously be processed. In the first embodiment, for the sake of explanation, it is supposed that N is equal to L equal to 3. However, there is no trouble as far as L is a natural number not less than N.

Figure 3:
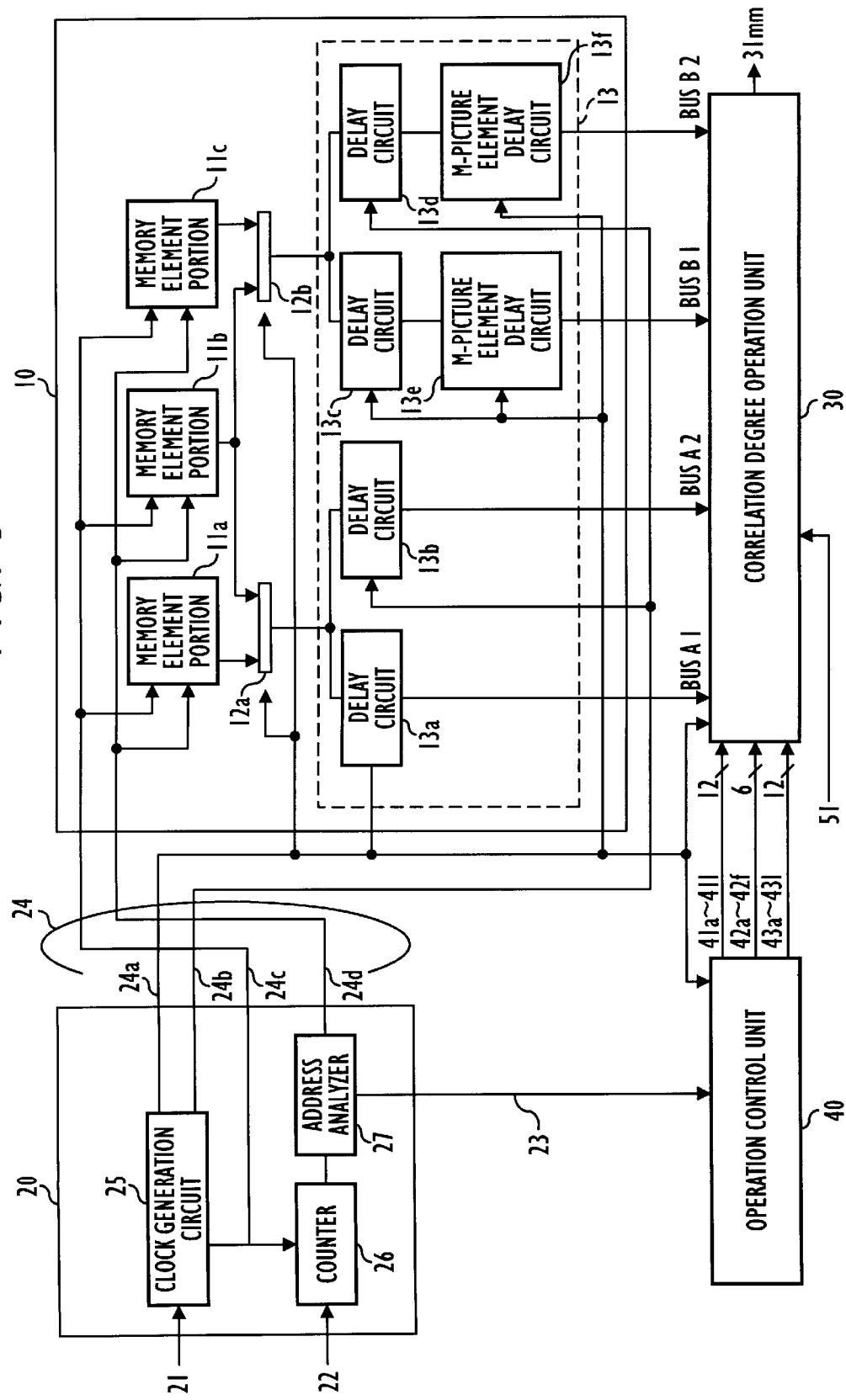
FIG. 3 is a block diagram illustrating the arrangement of a correlation degree operation apparatus according to an embodiment of the present invention.

FIG. 3 is a block diagram illustrating the arrangement of the correlation degree operation apparatus according to the first embodiment. Shown in FIG. 3 are a search area memory 10, a main control unit 20, a correlation degree operation unit 30 and an operation control unit 40.

The search area memory 10 comprises memory element portions 11a to 11c, memory selectors 12a, 12b, and delay means 13. The picture element data of the search area are stored in the memory element portions 11a to 11c. The search area memory 10 is arranged to supply, according to memory control signals 24 supplied from the main control unit 20, four picture element data in the search area to the correlation degree operation unit 30 through buses $A_1$, $A_2$, $B_1$, $B_2$. The delay means 13 comprises delay circuits 13a to 13d and M-picture element delay circuits 13e, 13f. The memory selectors 12a, 12b and the delay means 13 form timing adjust means.

The main control unit 20 comprises a clock generation circuit 25, a counter 26 and an address analyzer 27, and is arranged to supply the memory control signals 24 to the search area memory 10 and an operation control signal 23 to the operation control unit 40.

The clock generation circuit 25 is arranged to generate, based on entered clock 21, clock (odd-numbered clock) 24a having the same phase as that of the clock 21, clock (even-numbered clock) 24b having the reverse phase to that of the clock 21, and double clock 24c having frequency twice that of the clock 21. These clocks 24a, 24b, 24c are arranged to be supplied to the search area memory 10. The counter 26 is arranged to start counting in synchronism with the double clock 24c according to the instruction of a start signal 22 such that the counting data are supplied to the address analyzer 27. The address analyzer 27 is a decoder for generating, based on the counting data of the counter 26, an address 24d and the operation control signal 23. Thus, the address analyzer 27 supplies the operation control signal 23 to the operation control unit 40 and the address 24d to the search area memory 10. The memory control signals 24 comprise the odd-numbered clock 24a, the even-numbered clock 24b, the double clock 24c and the address 24d.

The double clock 24c and the address 24d supplied from the main control unit 20 are supplied to each of the memory element portions 11a to 11c. According to the address 24d thus given, picture element data is read out, per cycle of the double clock 24c, from each of the memory element portions 11a to 11c. The memory selectors 12a, 12b are switched by the odd-numbered clock 24a. At an odd-numbered cycle of the double clock 24c, the memory selector 12a selects and supplies the picture element data read from the memory element portion 11a to the delay circuit 13a, and the memory selector 12b selects and supplies the picture element data read from the memory element portion 11b to the delay circuit 13c. At an even-numbered cycle of the double clock 24c, the memory selector 12a selects and supplies the picture element data read from the memory element portion 11b to the delay circuit 13b, and the memory selector 12b selects and supplies the picture element data read from the memory element portion 11c to the delay circuit 13d. By the operations above-mentioned, four picture element data can be read from the memory element portions 11a to 11c per cycle of the clock 21.

Picture element data are entered into the delay circuits 13a, 13c by the odd-numbered clock 24a, and picture element data are entered into the delay circuits 13b, 13d by the even-numbered clock 24b. The delay circuits 13a, 13b supply the entered picture element data to buses $A_1$, $A_2$, respectively. The delay circuits 13c, 13d supply the entered picture element data to the M-picture element delay circuits 13e, 13f, respectively. The M-picture element delay circuits 13e, 13f supply the entered picture element data to respective buses $B_1$, $B_2$ after delay of M (=4) clocks.

The correlation degree operation unit 30 is arranged to operate, by a pipeline process using the picture element data respectively entered through the buses $A_1$, $A_2$, $B_1$, $B_2$, a degree of correlation between a given reference picture block 51 having (M×N) picture elements and each candidate block, and to supply correlation degree data 31m.

The operation control unit 40 is arranged to supply, to the correlation degree operation unit 30, storage control signal 41a to 41l, first changeover signal 42a to 42f and second changeover signal 43a to 43l, these signals being supplied according to the instruction of the operation control signal 23 supplied from the main control unit 20.

With reference to FIG. 4 to FIG. 7, the correlation degree operation unit 30 and the operation control unit 40 will be discussed in more detail.

Figure 4:
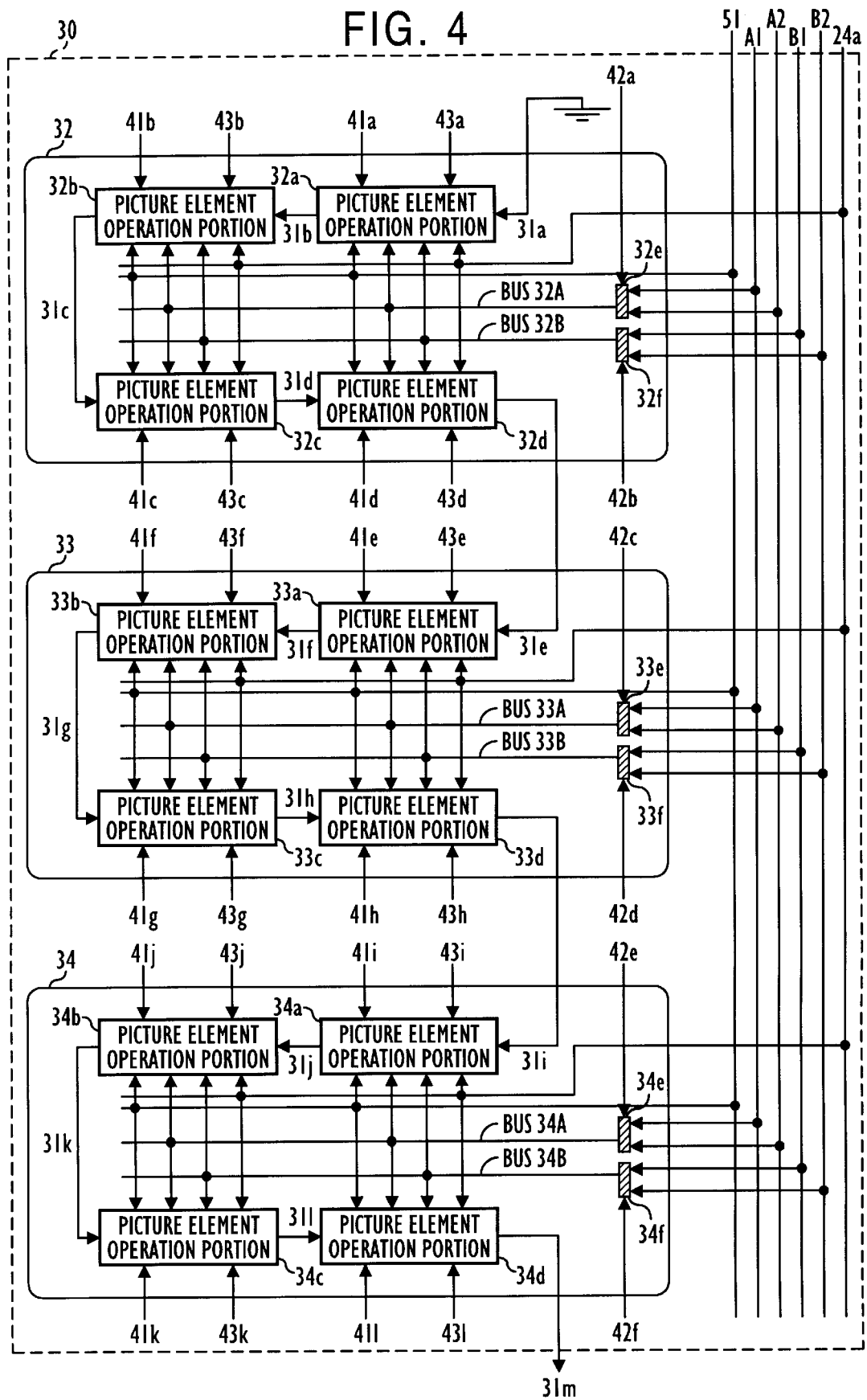
FIG. 4 is a block diagram illustrating the arrangement of the correlation degree operation unit in the correlation degree operation apparatus according to a first embodiment of the present invention.

FIG. 4 is a block diagram illustrating the inside arrangement of the correlation degree operation unit 30. As shown in FIG. 4, the correlation degree operation unit 30 comprises three (=N) line operation units each having four (=M) picture element operation portions and two first selectors. These line operation units 32 to 34 are the same in inside arrangement. Also, the picture element operation portions 32a to 32d, the picture element operation portions 33a to 33d, and the picture element operation portions 34a to 34d are the same in inside arrangement.

The line operation unit 32 has the picture element operation portions 32a to 32d and first selectors 32e, 32f. The first selector 32e selects and supplies, to a bus 32A, one picture element data out of two picture element data transferred through the buses $A_1$, $A_2$, and the first selector 32f selects and supplies, to a bus 32B, one picture element data out of two picture element data transferred through the buses $B_1$, $B_2$. The picture element operation portions 32a to 32d respectively store the picture element data of the reference picture block 51, and read the picture element data of a candidate block transferred through the bus 32A or 32B and then operate a differential absolute value in picture element data between the reference picture block and the candidate block.

The picture element operation portion 32a adds the operation result to an initial value 31a of correlation degree data ("0" in FIG. 4), and supplies the addition result data 31b to the subsequent-stage picture element operation portion 32b. The picture element operation portion 32b adds the operation result to the addition result data 31b and then supplies addition result data 31c. Similarly, the picture element operation portion 32c adds the operation result to the data 31c and then supplies addition result data 31d, and the picture element operation portion 32d adds the operation result to the data 31d and then supplies addition result data 31e. The data 31e is given to the picture element operation portion 33a of the line operation unit 33.

The picture element operation portions 33a to 33d of the line operation unit 33, and the picture element operation portions 34a to 34d of the line operation unit 34 operate in a similar manner, and the picture element operation portion 34d finally supplies the correlation degree data 31m.

Figure 5:
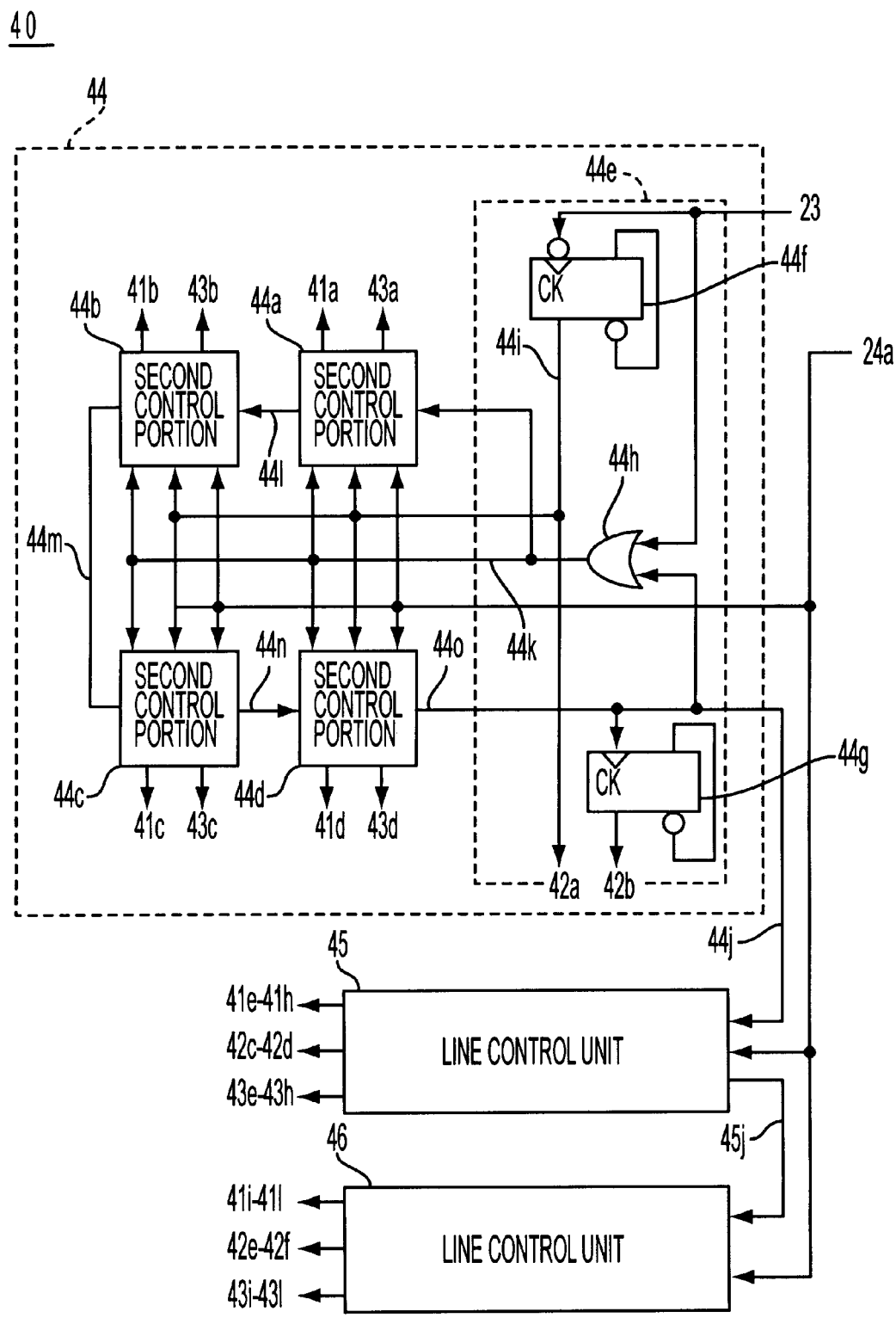
FIG. 5 is a block diagram of the operation control unit in the correlation degree operation apparatus according to the first embodiment of the present invention.

FIG. 5 is a circuit diagram illustrating the inside arrangement of the operation control unit 40. As shown in FIG. 5, the operation control unit 40 comprises three (=N) line control units each having one first control portion and four (=M) second control portions. Since these line control units 44 to 46 are the same in arrangement, the illustration of the arrangement of the line control units 45, 46 is here omitted.

The line control unit 44 comprises a first control portion 44e and second control portions 44a to 44d. Each of the second control portions 44a to 44d controls each of the picture element operation portions 32a to 32d in the line operation unit 32 in FIG. 4. When the main control unit 20 supplies the operation control signal 23 to the first control portion 44e, the first control portion 44e operates the second control portions 44a to 44d, which then supply storage control signals 41a to 41d and second changeover signals 43a to 43d to the picture element operation portions 32a to 32d, respectively. Also, the first control portion 44e supplies first changeover signals 42a, 42b for switching the first selectors 32e, 32f in the line operation unit 32.

After M (=4) clocks, the first control portion 44e supplies an operation control signal 44j to the subsequent-stage line control unit 45. The first control portion of the line control unit 45 conducts a similar control operation and then supplies, after M (=4) clocks, an operation control signal 45j to the subsequent-stage line control unit 46.

The following description will further discuss in detail the control of the correlation degree operation unit 30 by the operation control unit 40.

First, the description will discuss the control of the first selectors by the first control portion. The following will discuss, as an example, the control of the first selectors 32e, 32f by the first control portion 44e.

As shown in FIG. 5, when the operation control signal 23 is entered into the line control unit 44, a first register 44f supplies a storage enabling signal 44i as the first changeover signal 42a. As shown in FIG. 4, the first changeover signal 42a is supplied to the first selector 32e, and the first selector 32e selects either the bus $A_1$ or the bus $A_2$, and then supplies the data of the bus thus selected, to the bus 32A.

As shown in FIG. 5, after 4 (=M) clocks from the output of the first changeover signal 42a, a second register 44g supplies the first changeover signal 42b synchronized by an output signal 44o of the second control portion 44d. As shown in FIG. 4, the first changeover signal 42b is supplied to the first selector 32f, and the first selector 32f selects either the bus $B_1$ or the bus $B_2$ and then supplies the data of the bus thus selected, to the bus 32B.

As shown in FIG. 5, when the output signal 44o is supplied from the second control portion 44d, an initializing signal 44k is again supplied from an OR gate 44h. Thereafter, operations similar to those above-mentioned are repeated.

Secondly, the description will discuss the control of a picture element operation portion by a second control portion. The following will discuss, as an example, the control of the picture element operation portion 32b by the second control portion 44b.

When the operation control signal 23 is entered into the operation control unit 40, this starts (i) the storage of the picture element data of a reference picture block and (ii) the control of distribution of the picture element data of the candidate blocks. In FIG. 5, when the operation control signal 23 is entered into the line control unit 44, the first register 44f supplies the storage enabling signal 44i to the second control portions 44a to 44d. Also, the operation control signal 23 is entered into the OR gate 44h, and the OR gate 44h supplies the initializing signal 44k to the second control portions 44a to 44d. This initializing signal 44k initializes the second control portions 44a to 44d.

Figure 6:
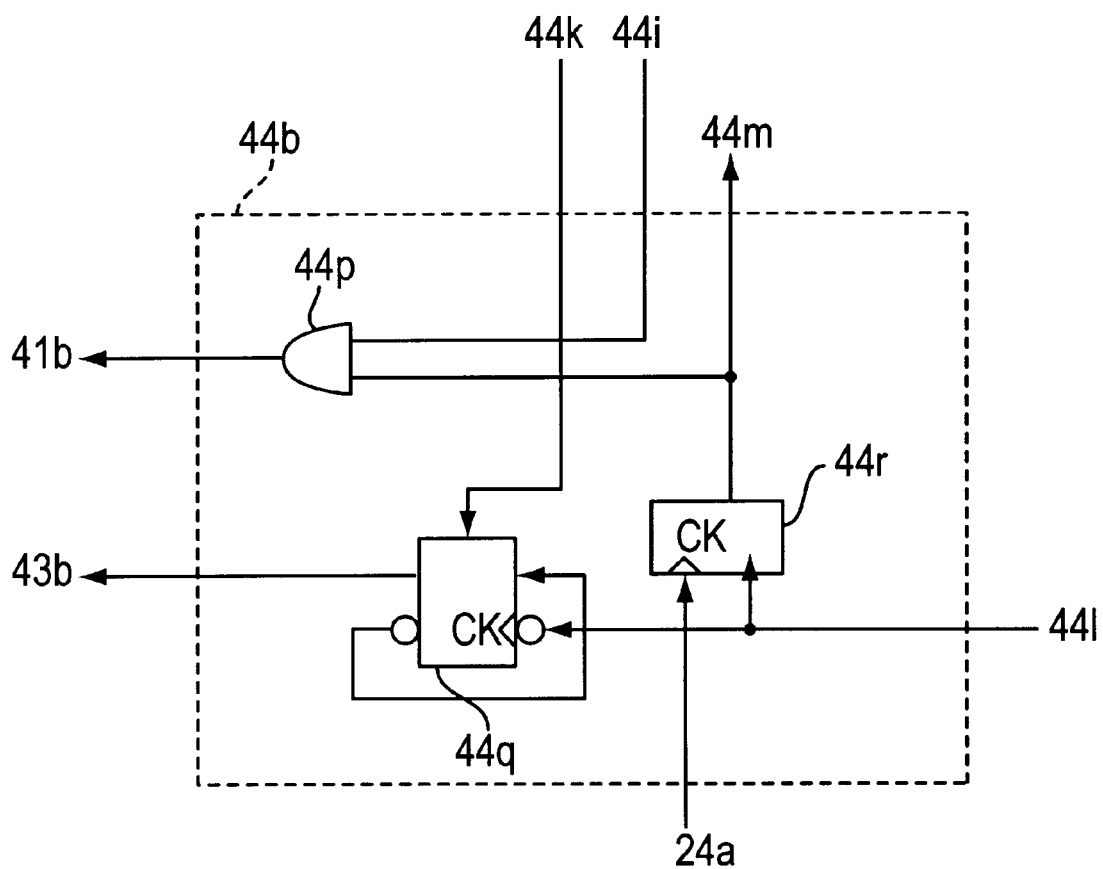
FIG. 6 is a circuit diagram illustrating the arrangement of a second control portion in the operation control unit in FIG. 5.
Figure 7:
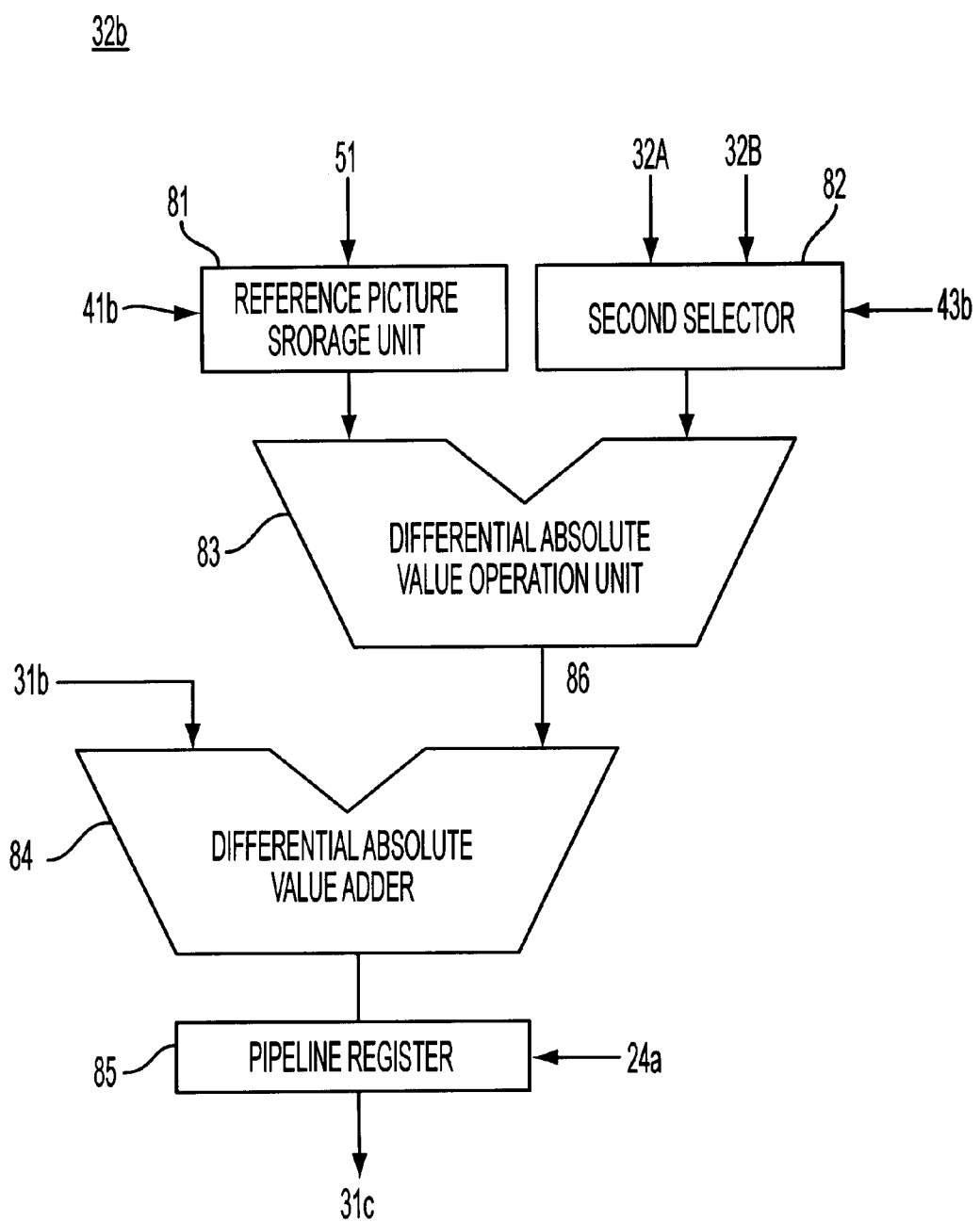
FIG. 7 is a block diagram of a picture element operation portion in the correlation degree operation unit in FIG. 4.

FIG. 6 is a circuit diagram illustrating the inside arrangement of the second control portion 44b. As shown in FIG. 6, the second control portion 44b comprises an AND gate 44p, a changeover circuit 44q and a propagation circuit 44r. FIG. 7 is a circuit diagram illustrating the inside arrangement of the picture element operation portion 32b. As shown in FIG. 7, the picture element operation portion 32b comprises a reference picture storage unit 81, a second selector 82, a differential absolute value operation unit 83, a differential absolute value adder 84 and a pipeline register 85.

As shown in FIG. 6, after one cycle from the entry of the initializing signal 44k, the second control portion 44b receives an output signal 44l of the previous-stage second control portion 44a at the timing of the odd-numbered clock 24a through the propagation circuit 44r. The AND gate 44p receives the storage enabling signal 44i and the output signal of the propagation circuit 44r and supplies a storage control signal 41b.

As shown in FIG. 7, the storage control signal 41b is supplied to the reference picture storage unit 81 of the picture element operation portion 32b.

After one cycle from the entry of the initializing signal 44k, the changeover circuit 44q is operated by the output signal 44l of the previous-stage second control portion 44a and the changeover circuit 44q supplies a second changeover signal 43b.

As shown in FIG. 7, the second changeover signal 43b is supplied to the second selector 82 of the picture element operation portion 32b, and the second selector 82 switches the bus to be selected according to the second changeover signal 43b.

An output signal 44m of the propagation circuit 44r is supplied to the subsequent-stage second control portion 44c. After executing a similar operation, the second control portion 44c supplies a signal 44n to the subsequent-stage second control portion 44d. Thus, the operations of the second control portions 44a to 44d are propagated per cycle. Also, the line control units 45, 46 conduct operations similar to those above-mentioned.

The picture element operation portion 32b operates in the following manner. As shown in FIG. 7, the differential absolute value operation unit 83 operates a differential absolute value (AE) between the picture element data of the candidate block selected by the second selector 82 and the picture element data of the reference picture block stored in the reference picture storage unit 81. The differential absolute value adder 84 adds a differential absolute value 86 supplied from the differential absolute value operation unit 83 to the sum of differential absolute values (SAE) 31b supplied from the previous-stage picture element operation portion 32a. The sum of differential absolute values 31c obtained by such addition is supplied, at the next clock cycle, to the subsequent-stage picture element operation portion 32c through the pipeline register 85. By repeating the operations above-mentioned for 12 clock cycles, there can be obtained the correlation degree data 31m between the reference picture block and the candidate blocks.

The following description will specifically discuss the operation of the correlation degree operation apparatus according to the first embodiment. It is now supposed that there is to be operated a degree of correlation between a reference picture block Bp and each of candidate blocks Bb as shown in FIGS. 1 and 2.

Figure 8:
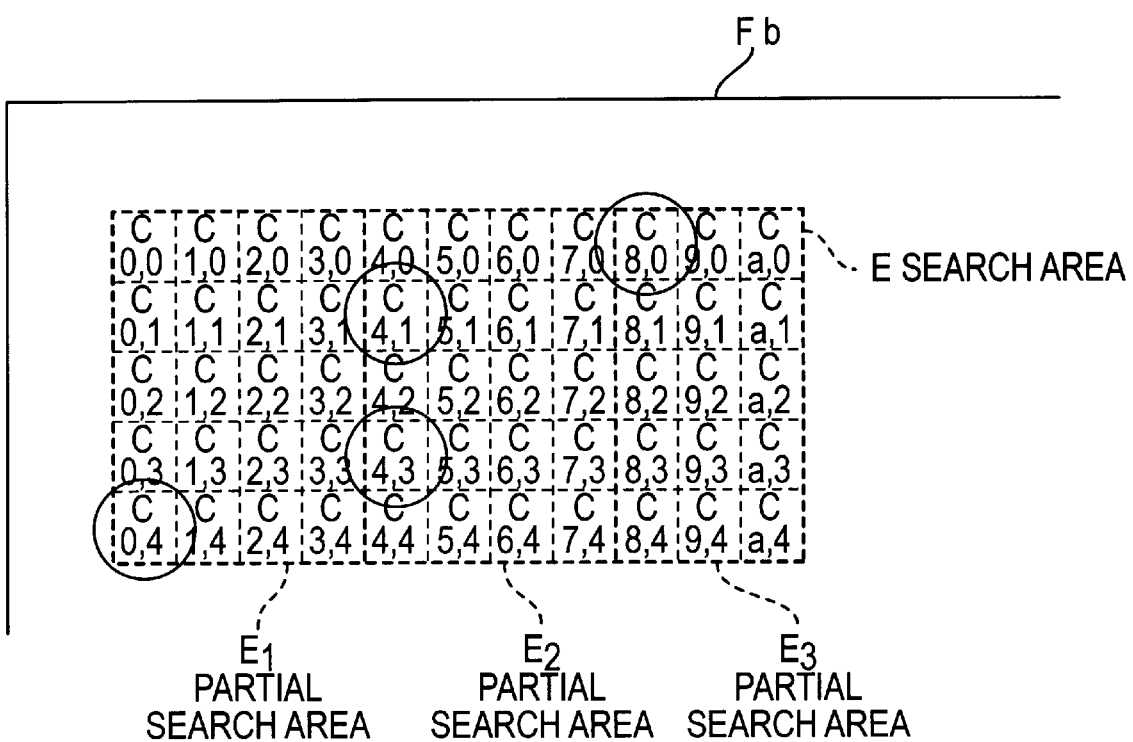
FIG. 8 is a view of picture element data to be stored in the memory element portions of the search area memory in the correlation degree operation apparatus according to an embodiment of the present invention.

The picture element data of the search area E are stored in the memory element portions 11a to 11c of the search area memory 10. FIG. 8 shows the picture element data stored in the memory element portions 11a to 11c. In FIG. 8, the picture element data of a partial search area $E_1$ are stored in the memory element portion 11a, the picture element data of a partial search area $E_2$ are stored in the memory element portion 11b, and the picture element data of a partial search area $E_3$ are stored in the memory element portion 11c. To share an address with the memory element portions 11a to 11c, the picture element data of the partial search area $E_1$ are stored in the memory element portion 11a in the order of C0,0, C1,0, C2,0, C3,0, C0,1, . . . C2,4, C3,4, the picture element data of the partial search area $E_2$ are stored in the memory element portion 11b in the order of C4,0, C5,0, C6,0, C7,0, C4,1, . . . C6,4, C7,4 and the picture element data of the partial search area $E_3$ are stored in the memory element portion 11c in the order of C8,0, C9,0, Ca,0, Cb,0 (dummy data), C8,1, . . . Ca,4, Cb, 4 (dummy data).

Figure 2A:
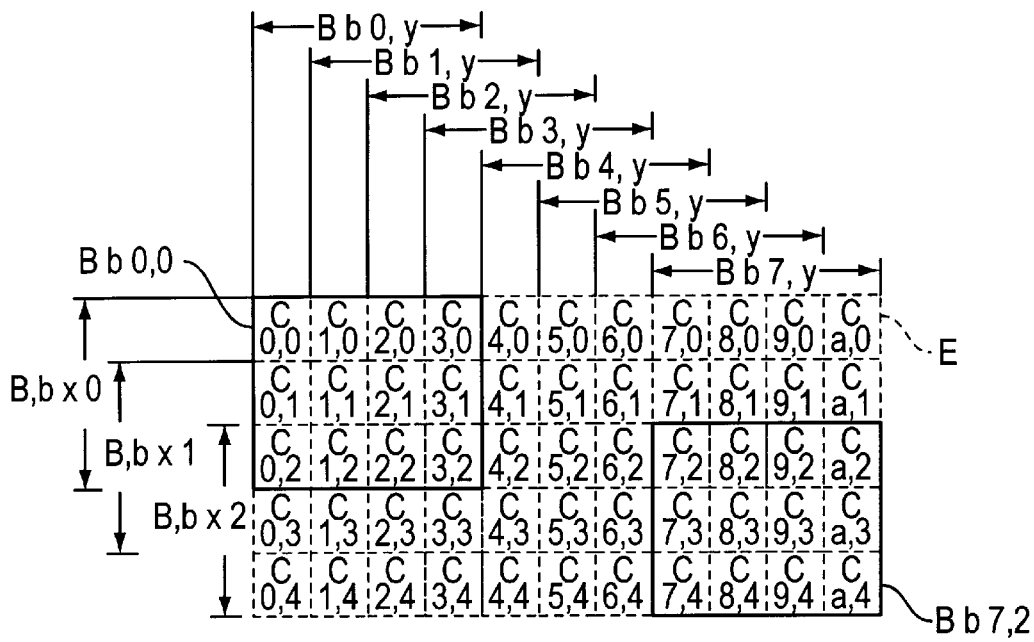
FIG. 2(a) is a view of candidate blocks Bb in the search area E, and each of FIG. 2(b)
Figure 2B:
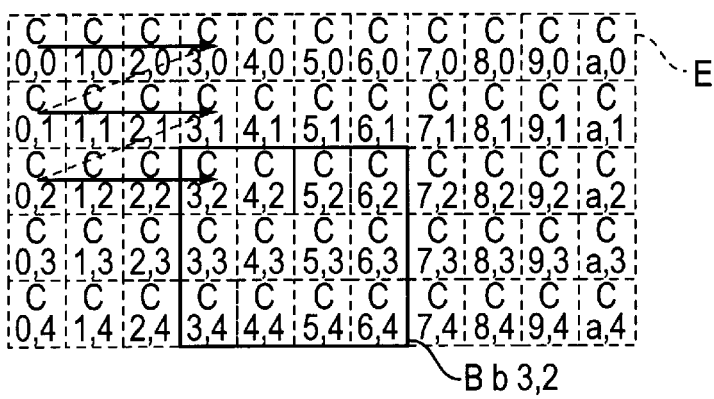
FIG. 2(c) is a view illustrating the candidate block Bb search order according to an embodiment of the present invention.
Figure 2C:
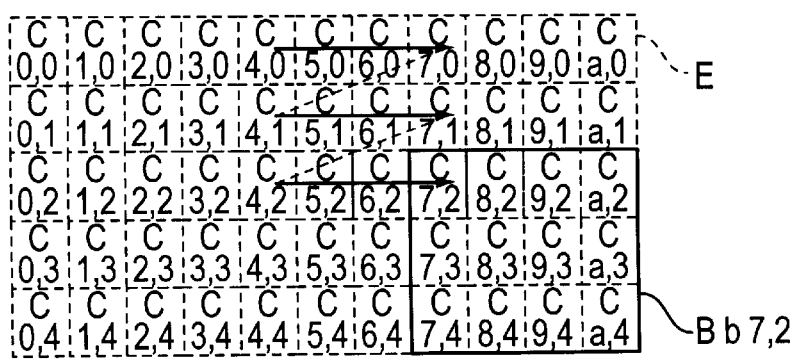
Figure 9:
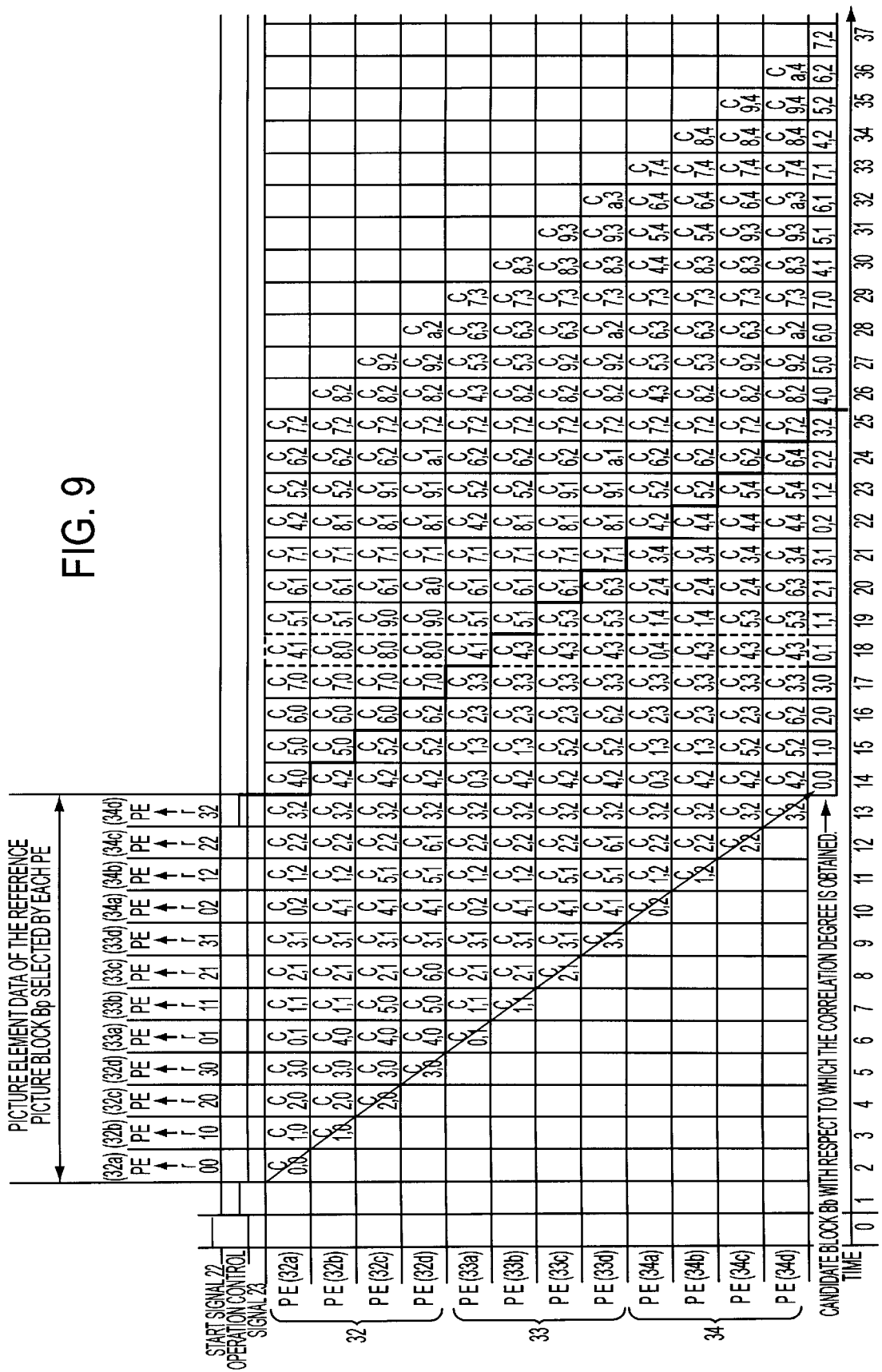
FIG. 9 is a view illustrating pipeline processes executed by the correlation degree operation apparatus according to an embodiment of the present invention and showing the picture element data required for the picture element operation portions at clock cycles.

FIG. 9 is a view illustrating pipeline processes achieved by the correlation degree operation apparatus of the first embodiment. Shown in FIG. 9 are the picture element data C in the search area E which are required by the picture element operation portions (PE) 32a to 34d at respective cycles. The subscript numerals of the picture element data C correspond to the subscript numerals of the picture element data C in the search area E in FIGS. 1 and 8. In FIG. 9, the process shown at the left hand with respect to the stairs-like bold line corresponds to the process shown in FIG. 2(b), and the process shown at the right hand with respect to the stairs-like bold line corresponds to the process shown in FIG. 2(C).

At time 18 for example, the picture element data required by the picture element operation portions (enclosed with a bold broken line in FIG. 9), are four data C4,1, C8,0, C4,3, C0, 4 each of which is enclosed with a circle in FIG. 8. In a correlation degree operation apparatus of prior art, such four picture element data as at time 18 cannot simultaneously be supplied. Accordingly, the processes at the right and left hands with respect to the stairs-like bold line cannot continuously be pipeline-processed. This results in the existence of a period of several cycles where no correlation degree is being operated.

The correlation degree operation apparatus of the first embodiment comprises means for supplying data to each of the picture element operation portions such that the pipeline processes can continuously be executed without interrupt.

FIG. 10 is a view illustrating the operation of the correlation degree operation apparatus of the first embodiment. More specifically, FIG. 10-1(a) is a view illustrating the operation of the main control unit 20, FIG. 10-1(b) is a view illustrating the picture element data read out from the memory element portions 11a to 11c, FIG. 10-3(c) is a view illustrating the picture element data supplied from the buses of the search area memory 10, and FIG. 10-3(d) is a view illustrating the buses selected by the first selectors of the correlation degree operation unit 30.

When the start signal 22 is entered, the counter 26 starts counting the double clock 24c supplied from the clock generation circuit 25, and supplies the counting data to the address analyzer 27. In FIG. 10-1(a), time is shown per cycle of an externally given clock 21. Therefore, the counter 26 supplies two counting data respectively at the timings of the odd-numbered clock 24a and the even-numbered clock 24b per cycle. When the counter 26 starts counting, the address analyzer 27 supplies the address 24d to the search area memory 10. The address 24d supplied at the timing of the odd-numbered clock 24a starts from "1", while the address 24d supplied at the timing of the even-numbered clock 24b starts from "9". Each of these numerals is successively incremented up to "20". When each of the address numerals is incremented up to "20", it is brought back to "1" at the next cycle and then again incremented.

FIG. 10-1(b) shows the picture element data read out from the memory element portions 11a to 11c by the address 24d. For example, when an address of "1" is supplied at the timing of the odd-numbered clock 24a, the picture element data C0,0, C4,0, 8,0 are read out from the memory element portions 11a, 11b, 11c, respectively. Further, the memory selector 12a supplies the picture element data C0,0 to the delay circuit 13a and the memory selector 12b supplies the picture element data C4,0 to the delay circuit 13c.

Then, when an address of "9" is supplied at the timing of the even-numbered clock 24b, the picture element data C0,2, C4,2, C8,2 are read out from the memory element portions 11a, 11b, 11c, respectively. Further, the memory selector 12a supplies the picture element data C4,2 to the delay circuit 13b and the memory selector 12b supplies the picture element data C8,2 to the delay circuit 13d.

It is noted, however, that the picture element data supplied to the delay circuits 13b, 13d at the times 1 to 12, are not required for the operation of correlation degree, and that the picture element data supplied to the delay circuits 13a, 13c at the times 21 to 32, are neither required for the operation of correlation degree. In FIG. 10(b), the picture element data to be actually used for the operation of correlation degree are enclosed with a bold-line frame, and the picture element data supplied to the delay circuits 13a, 13c but not used for the operation of correlation degree, are enclosed with a broken-line frame.

Here, the maximum value "20" for the address 24d corresponds to the number of the picture element data stored in each of the memory element portions 11a to 11c or to the number of the picture element data of each of the search areas portions $E_1$ to $E_3$. Generally, this is represented by the following equation:

Number of the picture elements in each partial search area=$M \times (N+L-1)=4 \times (3+3-1)=20$ In FIG. 10(a), there is a period of eight cycles from the time 13 to the time 20 which is enclosed with a bold line (where "13" to "20" are supplied as the address at the timing of the odd-numbered clock 24a and "1" to "8" are supplied as the address at the timing of the even-numbered clock 24b). This period refers to a period where the search area memory 10 supplies four picture element data. In this period, a difference between each address supplied at the timing of the odd-numbered clock 24a and each address supplied at the timing of the even-numbered clock 24b, is equal to 12. The foregoing is generally represented by the following equations:

Period where four picture element data are supplied=$M \times (N-1)=4 \times (3-1)=8$ Address difference=$M \times L=4 \times 3=12$ When the counting values of the counter 26 are equal to 25 and 26, the values of the address 24d are "13" at the timing of the odd-numbered clock 24a and "1" at the timing of the even-numbered clock 24b.

Generally speaking, when the counting values of the counter 26 are equal to "2×(M×L)+1" and "2×(M×L)+2", there is referred to, as the period where the search area memory 10 supplies four picture element data, the period of M×(N-1) cycles where the value of the address 24d is equal to "M×L+1" at the timing of the odd-numbered clock 24a and to "1" at the timing of the even-numbered clock 24b, and thereafter the value of the address 24d is equal to "M×(N+L-1)" at the timing of the odd-numbered clock 24a and to "M×(N-1)" at the timing of the even-numbered clock 24b.

More specifically, as understood from FIG. 10(b), there are used, for the operation of correlation degree, (i) the picture element data read out from the memory element portions 11a, 11b at the timing of the odd-numbered clock 24a during the first M×L (=12) cycles, (ii) the picture element data read out from the memory element portions 11a, 11b at the timing of the odd-numbered clock 24a and the picture element data read out from the memory element portions 11b, 11c at the timing of the even-numbered clock 24b during M×(N−1)(=8) cycles, and (iii) the picture element data read out from the memory element portions 11b, 11c at the timing of the even-numbered clock 24b during M×L (=12) cycles.

The picture element data entered into the delay circuit 13a is supplied to the bus $A_1$ after one cycle, and the picture element data entered into the delay circuit 13b is supplied to the bus $A_2$ after one cycle. Further, the picture element data entered into the delay circuit 13c is supplied, after one cycle, to the M-picture element delay circuit 13e. Then, this picture element data is delayed by a period of time corresponding to M (=4) clocks by the M-picture element delay circuit 13e, and then supplied to the bus $B_1$. The picture element data entered into the delay circuit 13d is supplied, after one cycle, to the M-picture element delay circuit 13f. Then, this picture element data is delayed by a period of time corresponding to M (=4) clocks by the M-picture element delay circuit 13f, and then supplied to the bus $B_2$.

FIG. 10(c) shows the picture element data supplied to the buses $A_1$, $A_2$, $B_1$, $B_2$. The picture element data supplied to the buses $B_1$, $B_2$ have been delayed by M clocks by the M-picture element delay circuits 13e, 13f, respectively. Accordingly, these picture element data are supplied as delayed by M cycles from the picture element data simultaneously read out from the memory element portions 11a to 11c. It is noted that FIG. 10(c) shows only the result of the picture element data enclosed with a solid bold frame in FIG. 10(b).

As to the picture element data at the time 18 (in the portion enclosed with a thick line in FIG. 10(c)), it is understood that the picture element data C0,4 is supplied to the bus $A_1$, the picture element data C4,3 is supplied to the bus $B_1$, the picture element data C4,1 is supplied to the bus $A_2$, and the picture element data C8,0 is supplied to the bus $B_2$. These picture element data correspond to the picture element data enclosed with a circle in FIG. 8, to the picture element data enclosed with a thick broken line in FIG. 9, and to the picture element data each enclosed with a circle in FIG. 10(b).

The picture element data C4,3 is delayed, by four cycles, from the picture element data C0,3 read from the memory element portion 11a at the same cycle (time 13), and supplied to the bus $B_1$ at the same cycle at which the picture element data C0,4 is supplied to the bus $A_1$. The picture element data C8,0 is delayed, by four cycles, from the picture element data C4,0 read out from the memory element portion 11b at the same cycle (time 13), and supplied to the bus $B_2$ at the same cycle at which the picture element data C4,1 is supplied to the bus $A_2$.

By supplying picture element data to the correlation degree operation unit in the manner above-mentioned, the pipeline process can continuously be executed without any interrupt when the operation sequence horizontally turns back according to the candidate block process order in FIG. 2. For example, when the sequence turns back from the candidate block Bb 3,0 to the candidate block Bb 0,1, both the picture element data C4,0 and the picture element data C0,1 can be supplied at the same cycle, thus preventing the pipeline process from being interrupted.

Further, by supplying, at the same cycle, the picture element data C0,4, C4,3 and the picture element data C4,1, C8,0 to the correlation degree operation unit 30, the pipeline process can continuously be executed without any interrupt when the operation sequence vertically turns back according to the candidate block process order in FIG. 2. For example, when the operation sequence turns back from the candidate block Bb 3,2 to the candidate block Bb 4,0, the pipeline process is not interrupted. Accordingly, the correlation degree operation unit 30 can continuously operate correlation degrees.

The correlation degree operation unit 30 receives, at the same cycle, maximum four picture element data per cycle from the buses $A_1$, $A_2$, $B_1$, $B_2$. As shown in FIG. 10(d), each of the first selectors 32e, 34f selects one bus out of the four types of buses $A_1$, $A_2$, $B_1$, $B_2$ according to the first changeover signals 42a to 42f supplied from the operation control unit 40. The signals of the selected buses are supplied to buses 32A to 34B to which the first selectors 32e, 34f are connected. By this operation, each of the picture element data required by the picture element operation portions 32a to 34d, is supplied to each of the buses of the line operation units 32 to 34.

Each of second selectors of the picture element operation portions 32a to 34d selects one bus out of two buses in each line operation unit to which picture element data are transferred, and then receives the picture element data required for the operation of correlation degree. In the line operation unit 32 for example, each of the second selectors of the picture element operation portions 32a to 32d selects either the bus 32A or the bus 32B, and receives the picture element data.

As a result of the operations above-mentioned, the picture element data to be entered to the picture element operation portions are as shown in FIG. 9 and the pipeline processes can continuously be executed.

When the start signal 22 is entered, a bus for the reference picture block 51 successively transfers 12 (=4×3=M×N) picture element data r0,0 to r3,2 of the reference picture block Bp in 12 cycles and these picture element data r0,0 to r3,2 are respectively stored in the picture element operation portions 32a to 34d. This operation is controlled by the storage control signals 41a to 41l. Each picture element operation portion holds the stored picture element data of the reference picture block Bp for a period of at least cycles in number which is equal to the number of the candidate blocks Bb (8×3 cycles in this embodiment), and conducts an operation using the entered picture element data of a candidate block Bb. As a result, there can be obtained, per cycle, the sum of differential absolute values with respect to each candidate block Bb in the order shown in FIG. 9. Then, by comparing in size the obtained sums of differential absolute values with one another, there can be obtained the candidate block having the highest correlation degree. Then, the motion vector can be obtained.

After 8×3 cycles have passed, the picture element data of the next reference picture block Bp can successively be entered to the picture element operation portions and the correlation degrees thereof with respect to candidate blocks can be operated.

As discussed in the foregoing, the correlation degree operation apparatus of the first embodiment can continuously operate, by pipeline processes, degrees of correlation between a reference picture block having (M×N) picture elements and (M×m)×L candidate blocks.

With reference to FIGS. 4 and 5, the following description will discuss the arrangements of the correlation degree operation unit 30 and the operation control unit 40.

The correlation degree operation apparatus of the first embodiment requires a number of picture element operation portions having the same arrangement. The layout arrangement of such picture element operation portions is greatly concerned with the circuit area. It is therefore required to give serious consideration to the layout arrangement when designing and producing such a correlation degree operation apparatus.

As shown in FIG. 4, the line operation units 32 to 34 have the same arrangement and are therefore disposed in parallel, and there are disposed, as the wiring lines interposed among the line operation units, only lines for transferring correlation degree data. In each line operation unit, the picture element operation portions are disposed in the form of a line symmetry with respect to the buses for transferring the picture element data of a reference picture block and the buses for transferring the picture element data of candidate blocks. Such an arrangement can not only shorten the bus lengths, but also minimize the lengths of the wiring lines for transferring correlation degree data by connecting them in a turning-back manner.

As shown in FIG. 5, the operation control unit 40 comprises the line control units 44 to 46 for controlling the line operation units, respectively. Accordingly, the correlation degree operation unit 30 and the operation control unit 40 can be formed by merely disposing, in parallel, blocks each formed by a pair of a line operation unit and a line control unit. Further, it is not required to externally add a control circuit even though the number of lines is increased. Thus, the correlation degree operation apparatus can be formed in a simple arrangement.

The following description will discuss the effect produced by the method of executing operations according to the candidate block process order shown in FIG. 2 used in the first embodiment, as compared with the effect produced by a method of successively scanning the search area E up to the horizontal ends.

Figure 11:
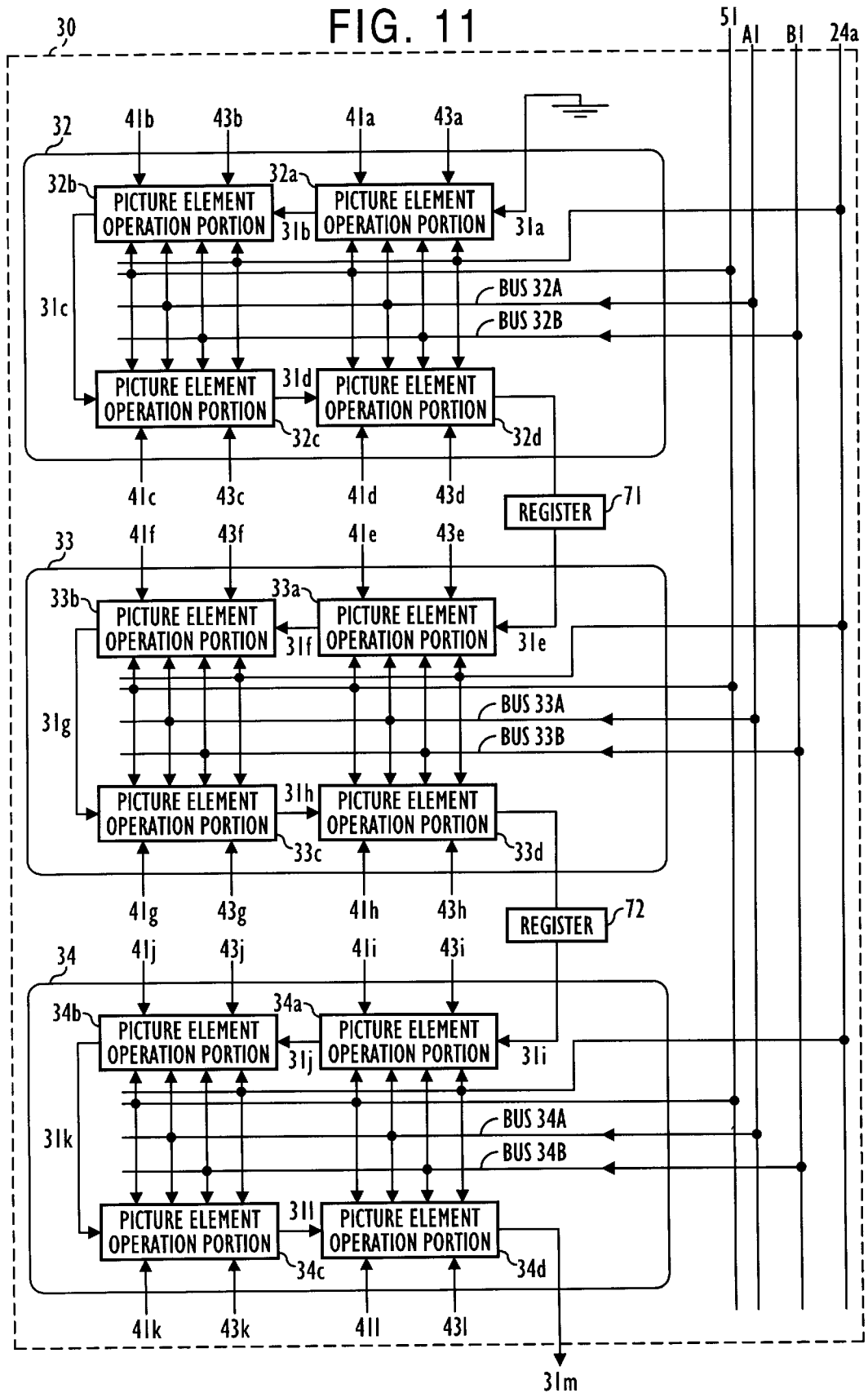
FIG. 11 is a block diagram illustrating the inside arrangement of a correlation degree operation unit to be used for operating a degree of correlation between a reference picture block and each of candidate blocks according to a method of successively scanning the search area horizontally up to the end.

FIG. 11 is a block diagram illustrating the inside arrangement of a correlation degree operation unit used for operating, in FIG. 1 showing the reference picture block Bp and the search area E, a correlation degree between the reference picture block Bp and each candidate block Bb according to a method of successively scanning the search area E up to the horizontal ends thereof. Further, FIG. 12 is a view of the flow of pipeline processes executed by the correlation degree operation unit shown in FIG. 11.

Figures 1, 12:
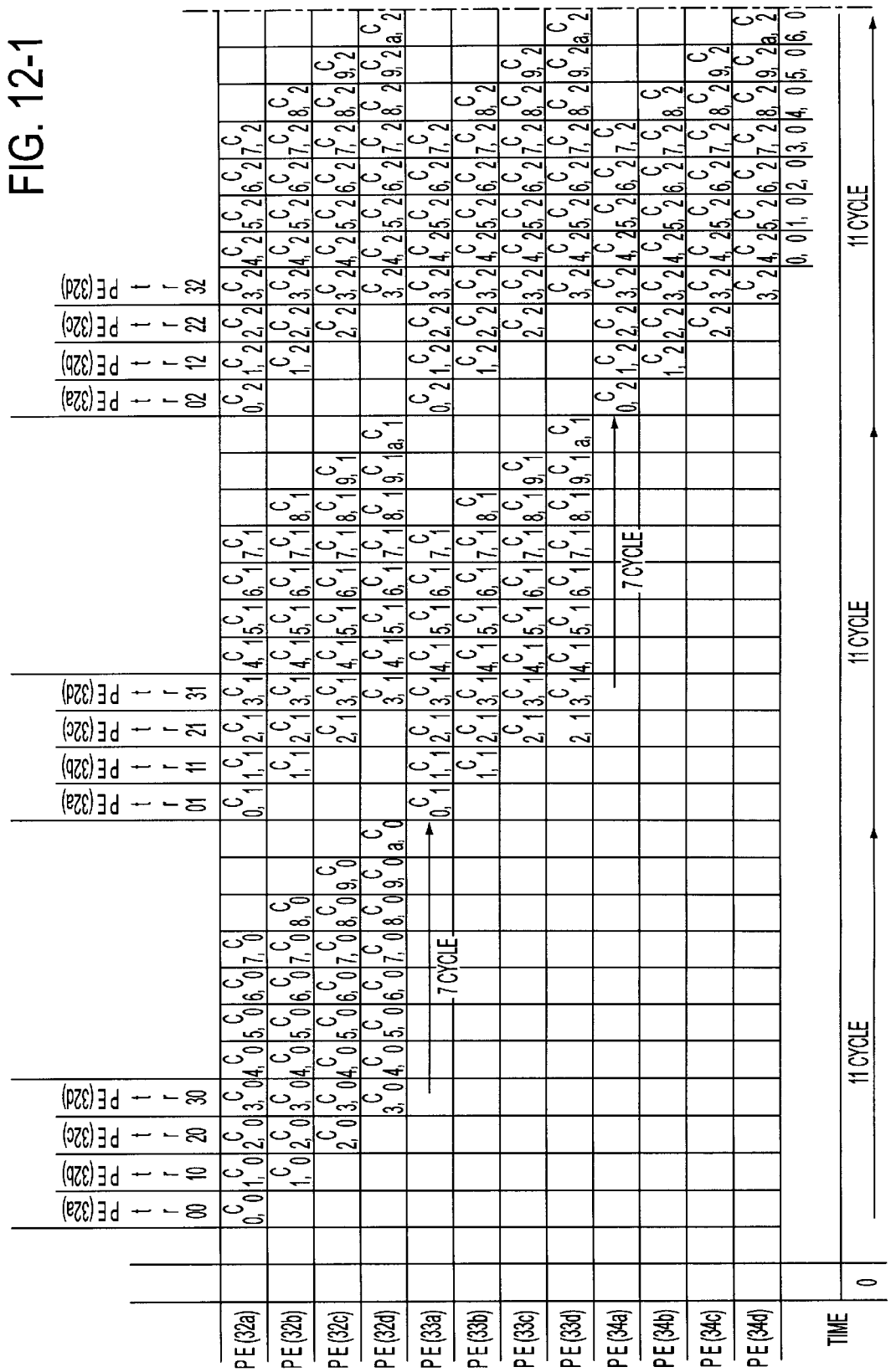
FIG. 12 is a view illustrating a flow of pipeline processes executed by the correlation degree operation unit shown in FIG. 11.
Figures 2, 12:
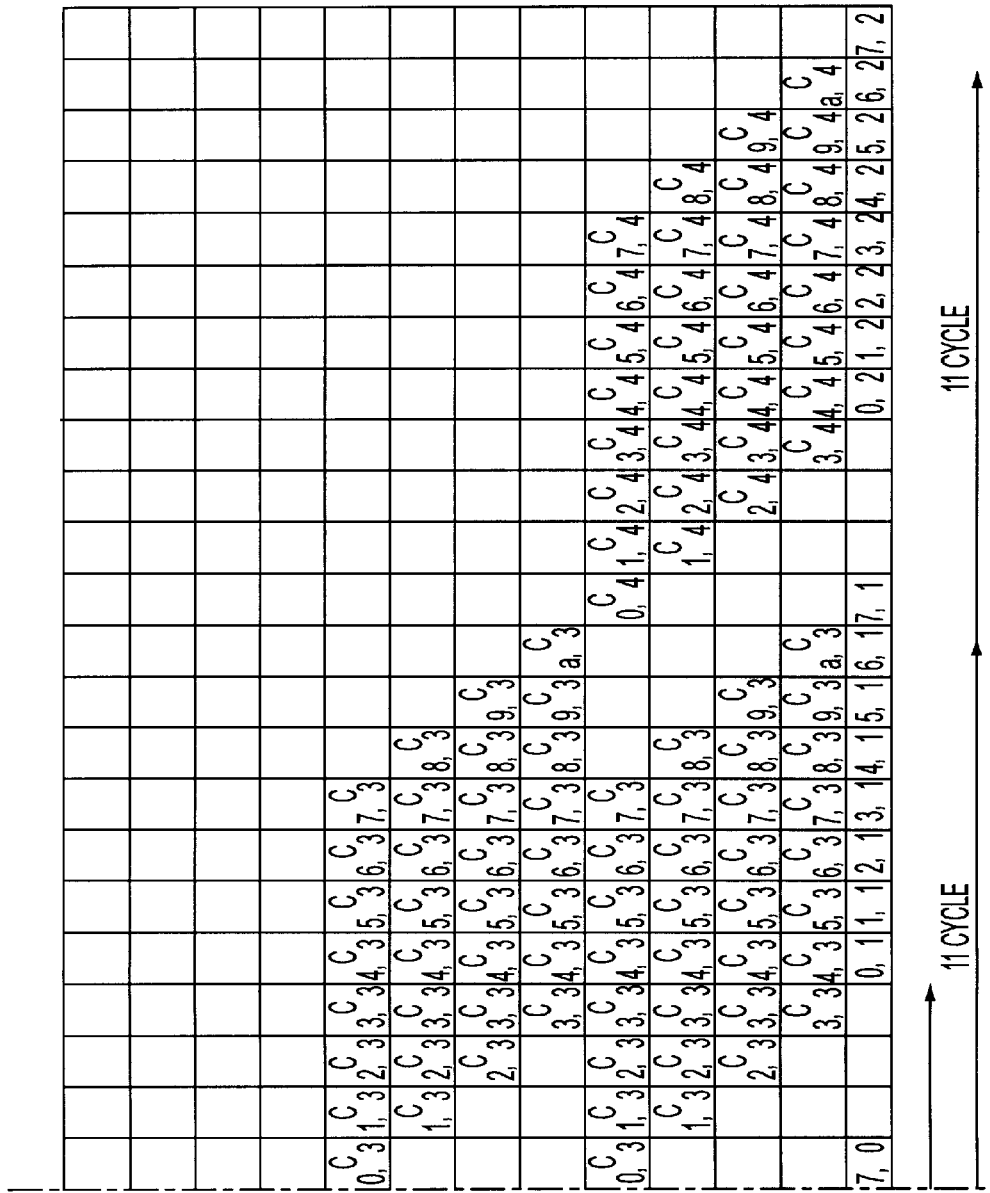

When comparing FIG. 12 with FIG. 9 illustrating the processes according to the first embodiment, it is understood that the usage efficiency of each picture element operation portion in FIG. 12 is considerably lowered. In FIG. 12, 56 cycles are required for obtaining the correlation degrees with respect to 24 candidate blocks. This lowers the process speed by about 65% as compared with the first embodiment of the present invention in which 36 cycles are required. As understood from FIG. 12, two delays each comprising 7 (=m×M−1) cycles are inevitable in the course of the operation. Thus, 7-stage registers 71, 72 are required as shown in FIG. 11. This increases the area of the apparatus in its entirety.

Thus, the use of the candidate block process order shown in FIG. 2 can not only increase the process speed, but also minimize the correlation degree operation apparatus in area.

(Second Embodiment)

The following description will discuss a correlation degree operation apparatus according to a second embodiment of the present invention.

Figure 13:
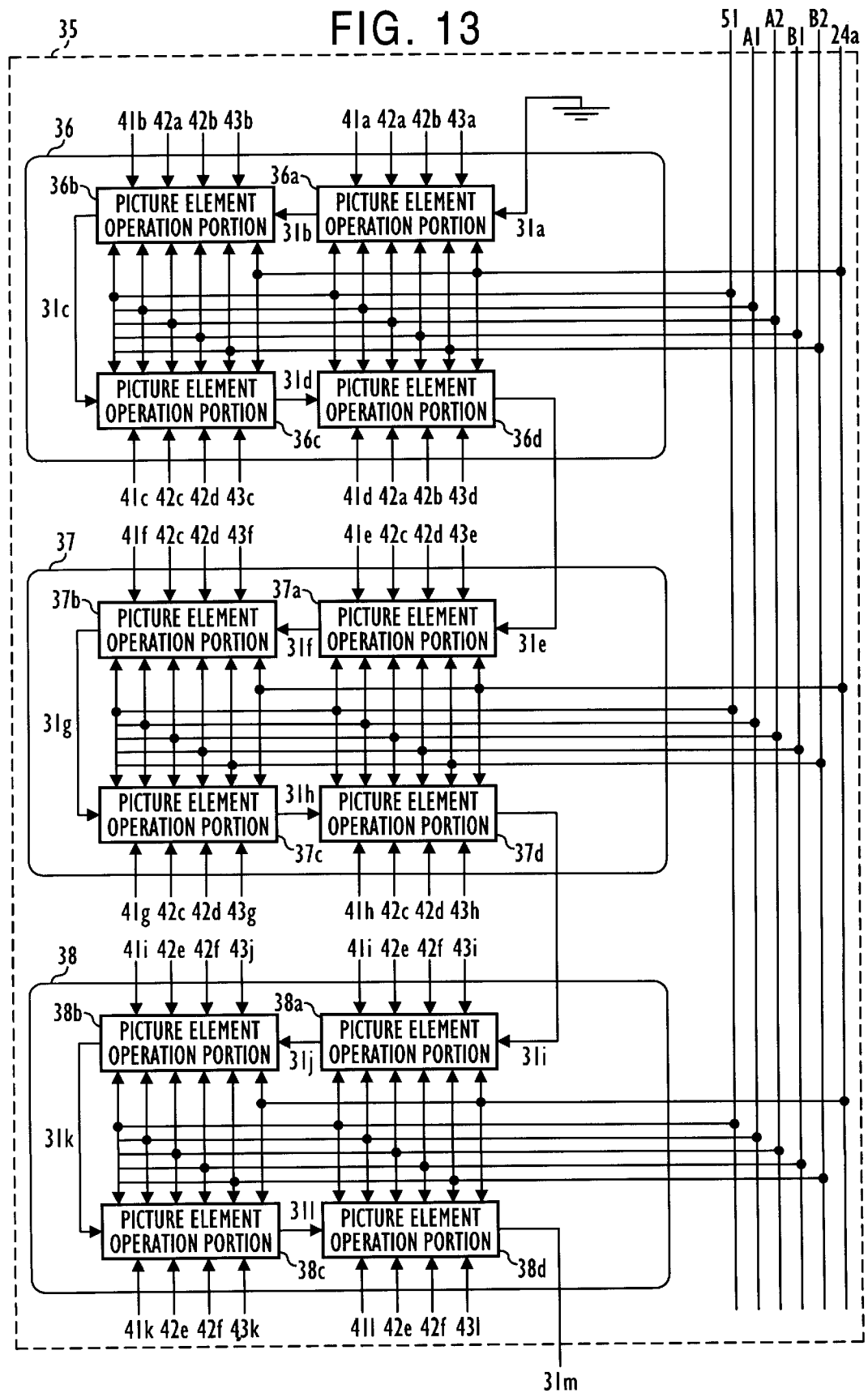
FIG. 13 is a block diagram illustrating the arrangement of the correlation degree operation unit in a correlation degree operation apparatus according to a second embodiment of the present invention.

FIG. 13 is a block diagram illustrating the inside arrangement of a correlation degree operation unit 35 in the correlation degree operation apparatus of the second embodiment. The correlation degree operation apparatus of the second embodiment is the same as the correlation degree operation apparatus in FIG. 3, except that the correlation degree operation unit 35 shown in FIG. 13 is used instead of the correlation degree operation unit 30 in the apparatus in FIG. 3.

The correlation degree operation unit 35 comprises three (=N) line operation units each having four (=M) picture element operation portions. The line operation units 36 to 38 have the same arrangement, and the picture element operation portions 36a to 36d, 37a to 37d, 38a to 38d have also the same arrangement.

The correlation degree operation unit 35 in FIG. 13 differs from the correlation degree operation unit 30 in FIG. 4 in that each of the picture element operation portions 36a to 38d incorporates means for selecting buses $A_1$, $A_2$, $B_1$, $B_2$. In the line operation unit 36 for example, no first selectors are disposed and the buses $A_1$, $A_2$, $B_1$, $B_2$ are connected directly to each of the picture element operation portions 36a to 36d. Further, first changeover signals 42a, 42b are also entered into the picture element operation portions 36a to 36d.

Figure 14:
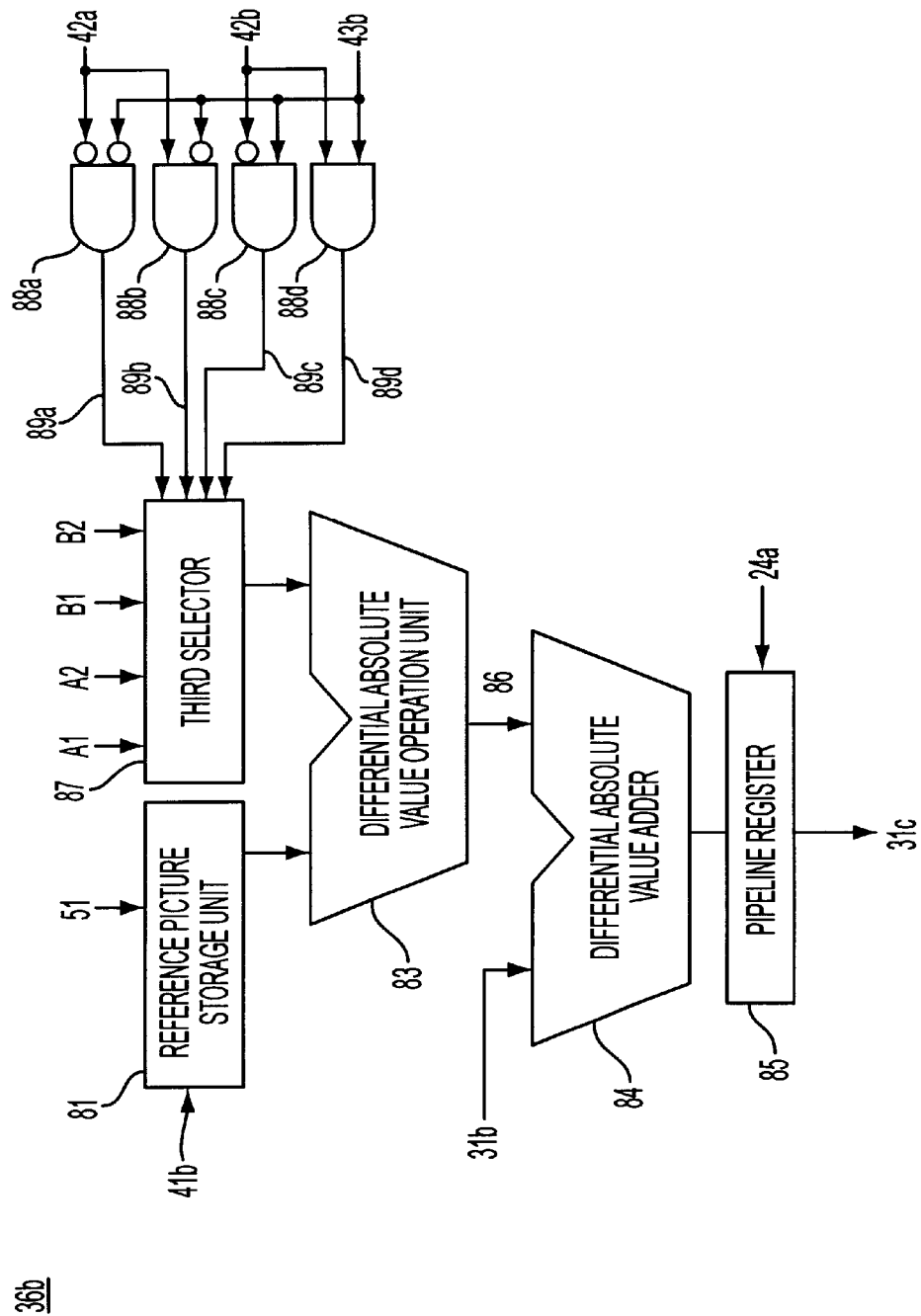
FIG. 14 is a block diagram illustrating the arrangement of a picture element operation portion of the correlation degree operation unit in the correlation degree operation apparatus according to the second embodiment of the present invention.

FIG. 14 is a block diagram illustrating the inside arrangement of the picture element operation portion 36b. In FIG. 14, a third selector 87 selects one bus out of the buses $A_1$, $A_2$, $B_1$, $B_2$ according to the first changeover signals 42a, 42b and a second changeover signal 43b, and then supplies the picture element data of the selected bus to a differential absolute value operation unit 83. The arrangement above-mentioned can assure an operation similar to that executed by the correlation degree operation apparatus according to the first embodiment.

(Third Embodiment)

Figure 15:
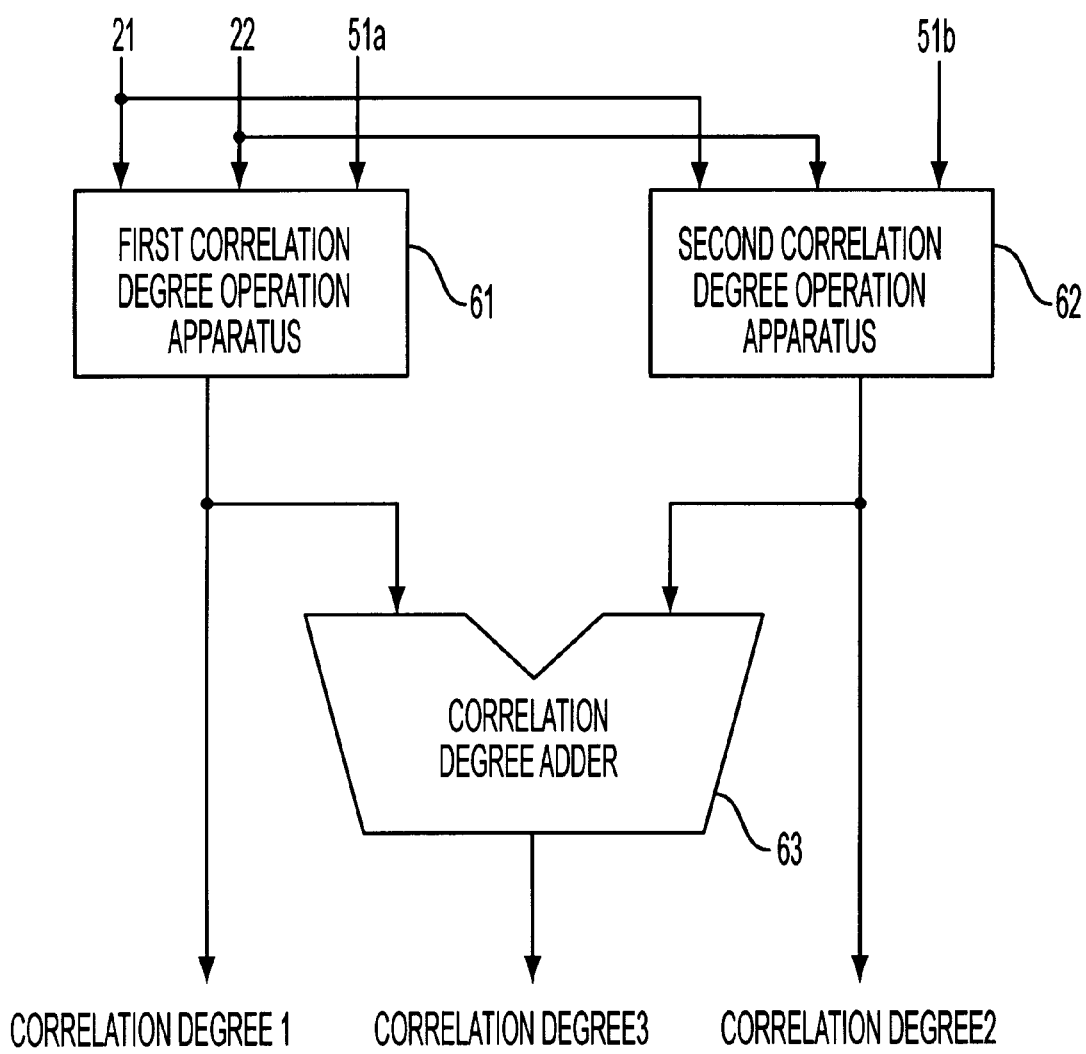
FIG. 15 is a block diagram illustrating the arrangement of a parallel correlation degree operation apparatus according to a third embodiment of the present invention.

FIG. 15 is a block diagram illustrating the arrangement of a parallel correlation degree operation apparatus according to a third embodiment of the present invention. Shown in FIG. 15 are a first correlation degree operation apparatus 61, a second correlation degree operation apparatus 62 and a correlation degree adder 63. Each of the first and second correlation degree operation apparatus 61, 62 is the correlation degree operation apparatus according to the first embodiment shown in FIG. 3. The first correlation degree operation apparatus 61 operates a correlation degree 1 of a reference picture block 51a, and the second correlation degree operation apparatus 62 operates a correlation degree 2 of a reference picture block 51b. The correlation degree adder 63 adds the correlation degrees 1 and 2 to each other, thereby to supply a correlation degree 3. This achieves a high-speed process for simultaneously calculating (i) the correlation degrees of two search area portions into which the search area is being divided, and (ii) the correlation degree of the search area in its entirety.

In the motion vector detection according to the MPEG2, it is expected to obtain three types of motion vectors including two motion vectors obtained based on two types of fields forming one frame and one motion vector obtained based on the frame.

The parallel correlation degree operation apparatus in FIG. 15 can operate the evaluation values of respective fields by the two correlation degree operation apparatus, and can also operate the evaluation value of the frame by merely adding the first-mentioned evaluation values to each other. Why three types of evaluation values can be operated by such a simple arrangement, is because the correlation degree operation apparatus of the present invention can operate an evaluation value per cycle.

In each of the first to third embodiments, the description has been made of the arrangement in which M is equal to 4, N is equal to 3, m is equal to 2 and L is equal to 3. More specifically, the reference picture block Bp has a block size of 4×3 picture elements and the number of candidate blocks Bb is (2×4)×3. However, the present invention is not limited to this arrangement. That is, pipeline processes can continuously be executed for a reference picture block Bp having (M×N) picture elements with respect to ((m×M)×L) candidate blocks Bb. Further, similar processes can continuously be executed without interrupt for reference picture blocks in optional number. However, it is noted that each of M, N, L, m is a natural number, that L is not less than N and that m is not less than 2.

In each of the first to third embodiments, the description has been made of the arrangement in which the sum of differential absolute values is used as the correlation degree evaluation data. However, the present invention is not limited to the above, but may also be applied to any type of apparatus so arranged as to conduct an evaluation calculation of correlation degree using the sum of differential squares, a size comparator or the like.

In each of the first to third embodiments, to reduce the search area memory in area, the number of the memory element portions is minimized and the data supplied from the memory element portions are controlled by timing adjust means to supply picture element data to the picture element operation portions. However, a large number of memory element portions may be disposed and picture element data may be stored in the memory element portions in such order as required by the picture element operation portions.

In each of the first to third embodiments, pipeline processes are continuously executed to enhance the operation efficiency of the picture element operation portions. However, the left- and right-hand processes with respect to the stairs-like thick line in FIG. 9 may not always be continuously executed.

To increase the process speed of the correlation degree operation unit, pipeline registers in a plurality of stages may be inserted.

What is claimed is:

1. A correlation degree operation apparatus for operating, according to a block matching method, a degree of correlation between a reference picture block having (M×N) picture elements and each of ((m×M)×L) candidate blocks (in which each of M, N, L, m is a natural number, L is not less than N and m is not less than 2), characterized in that:

an operation of correlation degree is executed by a pipeline process for each of m candidate block groups composed of (M×L) candidate blocks, said m candidate block groups are continuously arranged to overlap one another in one of a horizontal direction and vertical direction;

said pipeline process is an operation of repeating, L times in the other direction than the direction in which said m candidate block groups overlap, a step of applying a block-matching process to a reference picture block with respect to each of M candidate blocks arranged to continuously overlap one another in said one direction; and there are used, at the same clock cycle, both the picture element data required for an operation of correlation degree for one candidate block group and the picture element data required for an operation of correlation degree for another candidate block group to be executed subsequently to said first-mentioned operation for said one candidate block group.

2. A correlation degree operation apparatus for operating, according to a block matching method, a degree of correlation between a reference picture block having (M×N) picture elements and each of ((m×M)×L) candidate blocks (in which each of M, N, L, m is a natural number, L is not less than N and m is not less than 2), comprising:

a search area memory for storing the picture element data of a search area including ((m×M)×L) candidate blocks; and a correlation degree operation unit for holding the picture element data of a reference picture block having (M×N) picture elements and executing an operation of a degree of correlation between said reference picture block and each of said candidate blocks, with the use of said held picture element data of said reference picture block and the picture element data of each candidate block supplied from said search area memory, said operation being executed by a pipeline process for each candidate block group composed of (M×L) candidate blocks, said search area memory having the function of supplying, to said correlation degree operation unit at the same clock cycle, both the picture element data required for an operation of correlation degree for one candidate block group and the picture element data required for an operation of correlation degree for another candidate block group to be executed subsequently to said first-mentioned operation for said one candidate block group, said correlation degree operation unit being arranged to continuously execute the operations for said candidate block groups.

3. A correlation degree operation apparatus according to claim 2, wherein said search area memory has the function of selecting, out of the picture element data of said search area having ((m+1)×M−1) columns and (L+N−1) rows and including ((m×M)×L) candidate blocks, (i) a first picture element data and a second picture element data which is located on the row upper by one row from said first picture element data and which is located in the column rightward by M columns from said first picture element data, said first and second picture element data being required for said operation for said one candidate block group, and (ii) a third picture element data and a fourth picture element data which is located on the row upper by one row from said third picture element data and which is located in the column rightward by M columns from said third picture element data, said third and fourth picture element data being required for said operation for said another candidate block group, said first to fourth picture element data being supplied to said correlation degree operation unit at the same clock cycle.

4. A correlation degree operation apparatus according to claim 3, wherein said third picture element data is located on the row upper by L rows from said first picture element data and in the column rightward by M columns from said first picture element data.

5. A correlation degree operation apparatus for operating, according to a block matching method, a degree of correlation between a reference picture block having (M×N) picture elements and each of ((m×M)×L) candidate blocks (in which each of M, N, L, m is a natural number, L is not less than N and m is not less than 2), comprising:

a main control unit for generating and supplying a memory control signal and an operation control signal based on a given clock;

a search area memory which stores the picture element data of a search area including ((m×M)×L) candidate blocks, and which is arranged to supply stored picture element data according to the instruction of said memory control signal supplied from said main control unit;

a correlation degree operation unit for holding the picture element data of a reference picture block having (M×N) picture elements and executing an operation of a degree of correlation between said reference picture block and each of said candidate blocks, with the use of said held picture element data of said reference picture block and the picture element data supplied from said search area memory, said operation being executed by a pipeline process for each candidate block group composed of (M×L) candidate blocks; and an operation control unit for controlling said correlation degree operation unit according to the instruction of said operation control signal supplied from said main control unit, said search area memory having the function of supplying, to said correlation degree operation unit at the same clock cycle, both the picture element data required for an operation of correlation degree for one candidate block group and the picture element data required for an operation of correlation degree for another candidate block group to be executed subsequently to said first-mentioned operation for said one candidate block group, said correlation degree operation unit being arranged to continuously execute the operations for said candidate block groups.

6. A correlation degree operation apparatus according to claim 5, wherein said search area memory has the function of selecting, out of the picture element data of said search area having ((m+1)×M−1) columns and (L+N−1) rows and including ((m×M)×L) candidate blocks, (i) a first picture element data and a second picture element data which is located on the row upper by one row from said first picture element data and which is located in the column rightward by M columns from said first picture element data, said first and second picture element data being required for said operation for said one candidate block group, and (ii) a third picture element data and a fourth picture element data which is located on the row upper by one row from said third picture element data and which is located in the column rightward by M columns from said third picture element data, said third and fourth picture element data being required for said operation for said another candidate block group, said first to fourth picture element data being supplied to said correlation degree operation unit at the same clock cycle.

7. A correlation degree operation apparatus according to claim 6, wherein said third picture element data is located on the row upper by L rows from said first picture element data and in the column rightward by M columns from said first picture element data.

8. A correlation degree operation apparatus according to claim 5, wherein said search area memory has the function of supplying four picture element data for one clock cycle.

9. A correlation degree operation apparatus according to claim 8, wherein said search area memory comprises:

(m+1) memory element portions which respectively store the picture element data of (m+1) partial search areas obtained by dividing, per (M×(L+N−1)) picture elements, said search area having ((m+1)×M−1) columns and (L+N−1) rows and including ((m×M)×L) candidate blocks, and which are arranged to read out picture element data according to the access instruction of said memory control signal supplied from said main control unit; and timing adjust means for adjusting, in timing, picture element data read out from said (m+1) memory element portions and supplying said picture element data to said correlation degree operation unit, said main control unit being arranged to supply said memory control signal such that two accesses are made in said search area memory for one clock cycle, said timing adjust means being arranged to select two picture element data out of the picture element data read from said (m+1) memory element portions at one access, and to supply, per clock cycle, four picture element data after adjusted in timing.

10. A correlation degree operation apparatus according to claim 9, wherein said timing adjust means comprises:

a first memory selector for selecting and supplying one picture element data out of the picture element data read from the first to mth memory element portions out of said (m+1) memory element portions;

a second memory selector for selecting and supplying one picture element data out of the picture element data read from the second to (m+1)th memory element portions out of said (m+1) memory element portions; and delay means for delaying, by M clock cycles, said picture element data selected and supplied by said second memory selector, from said picture element data selected and supplied by said first memory selector.

11. A correlation degree operation apparatus according to claim 8, wherein said correlation degree operation unit comprises N line operation units each comprising:

two first selectors each for selecting and supplying one picture element data out of said four picture element data supplied from search area memory, said two selected and supplied picture element data being different from each other; and M picture element operation portions each of which holds each of the picture element data of a reference picture block, which selects one picture element data out of said two picture element data selectively supplied by said two first selectors and which operates an evaluation value of correlation between said selected one picture element data and said held picture element data, said evaluation values of correlation operated by said picture element operation portions being accumulated by one another to obtain a degree of correlation between said reference picture block having (M×N) picture elements and each of said candidate blocks.

12. A correlation degree operation apparatus according to claim 11, wherein each of said picture element operation portions comprises:

a reference picture storage unit for holding the entered picture element data of a reference picture block;

a second selector for selecting one picture element data out of said two picture element data respectively selected and supplied by said two first selectors;

an operation unit for operating an evaluation value of correlation between said picture element data held by said reference picture storage unit and said picture element data selected by said second selector;

an adder for adding said evaluation value operated by said operation unit to the accumulated evaluation value supplied from the previous-stage picture element operation portion; and a register for once storing the output data of said adder and supplying said output data to the subsequent-stage picture element operation portion.

13. A correlation degree operation apparatus according to claim 11, wherein in each of said line operation units, said M picture element operation portions are symmetrically disposed in two lines at both sides of buses for transferring the picture element data selected and supplied by said first selectors.

14. A correlation degree operation apparatus according to claim 13, wherein an evaluation value is transferred, as successively accumulated by the previous-stage evaluation value, in the order (i) from, in the one line of picture element operation portions, the picture element operation portion disposed at the end at the side where said first selectors are disposed, toward the picture element operation portion disposed at the end at the side where said first selectors are not disposed, (ii) then, to the other-line picture element operation portion disposed at the end at the side where said first selectors are not disposed, (iii) then, in the other line of picture element operation portions, from said picture element operation portion disposed at the end at the side where said first selectors are not disposed, toward the picture element operation portion disposed at the end at the side where said first selectors are disposed.

15. A correlation degree operation apparatus according to claim 8, wherein said correlation degree operation unit comprises (M×N) picture element operation portions each for holding each of the picture element data of a reference picture block, selecting one picture element data out of the four picture element data supplied from said search area memory, and operating an evaluation value of correlation between said selected one picture element data and said held picture element data, said evaluation values operated by said picture element operation portions being accumulated by one another to obtain a degree of correlation between said reference picture block having (M×N) picture elements and each of said candidate blocks.

16. A correlation degree operation apparatus according to claim 15, wherein each of said picture element operation portions comprises:

a reference picture storage unit for holding the entered picture element data of a reference picture block;

a selector for selecting one picture element data out of said four picture element data supplied from said search area memory;

an operation unit for operating an evaluation value of correlation between said picture element data held by said reference picture storage unit and said picture element data selected by said selector;

an adder for adding said evaluation value operated by said operation unit to the accumulated evaluation value supplied from the previous-stage picture element operation portion; and a register for once storing the output data of said adder and supplying said output data to the subsequent-stage picture element operation portion.

17. A correlation degree operation apparatus according to claim 8, wherein said correlation degree operation unit comprises N line operation units for holding M picture element data on each row of a reference picture block and operating evaluation values of correlation between said held picture element data and said picture element data supplied from said search area memory, and said operation control unit comprises N line control units for respectively controlling said N line operation units.

18. A correlation degree operation apparatus according to claim 17, wherein said N line control units are cascade-connected to one another and said operation control signal entered into said operation control unit is transferred successively to said N line control units.

19. A correlation degree operation apparatus according to claim 18, wherein:

each of said line operation units comprises, two first selectors each for selecting and supplying one picture element data out of said four picture element data supplied from said search area memory, said two selected and supplied picture element data being different from each other, and M picture element operation portions each of which holds each of the picture element data of a reference picture block, which selects one picture element data out of said two picture element data selectively supplied by said two first selectors and which operates an evaluation value of correlation between said selected one picture element data and said held picture element data; and each of said line control units comprises, a first control portion for controlling said two first selectors, and M second control portions for respectively controlling said M picture element operation portions.

20. A correlation degree operation apparatus according to claim 19, wherein said M second control portions in each of said line control units, are cascade-connected to one another, and an operation control signal entered into each of said line control units is transferred successively to said M second control portions and then supplied after M clock cycles from the entry of said operation control signal.

21. A correlation degree operation apparatus for operating, according to a block matching method, a degree of correlation between a reference picture block having (M×N) picture elements and each of a plurality of candidate blocks (in which each of M and N is a natural number), comprising:

a search area memory for storing the picture element data of a search area including candidate blocks subjected to an operation of correlation degree;

a correlation degree operation unit for holding the picture element data of a reference picture block having (M×N) picture elements and executing, by a pipeline process, an operation of a degree of correlation between said reference picture block and each of said candidate blocks, with the use of said held picture element data of said reference picture block and the picture element data of each candidate block supplied from said search area memory; and an operation control unit for controlling said correlation degree operation unit according to an operation control signal entered into said operation control unit, said correlation degree operation unit comprising N line operation units each having M picture element operation portions for respectively holding the picture element data of said reference picture block and operating evaluation values of correlation between said held picture element data and picture element data supplied from said search area memory, and said operation control unit comprising N line control units for respectively controlling said N line operation units.

22. A correlation degree operation apparatus according to claim 21, wherein said N line control units are cascade-connected to one another and said operation control signal entered into said operation control unit is transferred successively to said N line control units.

23. A correlation degree operation apparatus according to claim 22, wherein each of said line control units comprises M control portions for respectively controlling said M picture element operation portions.

24. A correlation degree operation apparatus according to claim 23, wherein said M control portions in each of said line control units, are cascade-connected to one another, and an operation control signal entered into each of said line control units is transferred successively to said M control portions and then supplied after M clock cycles from the entry of said operation control signal.

25. A parallel correlation degree operation apparatus operating at the same clock cycle comprising:

a first correlation degree operation apparatus for operating a degree of correlation between a first reference picture block and a candidate block;

a second correlation degree operation apparatus for operating a degree of correlation between a second reference picture block and a candidate block; and a correlation degree adder for adding said degree of correlation operated by said first correlation degree operation apparatus to said degree of correlation operated by said second correlation degree operation apparatus, wherein each of said first and second correlation degree operation apparatus is a correlation degree operation apparatus for operating, according to a block matching method, a degree of correlation between a reference picture block having (M×N) picture elements and each of ((m×M)×L) candidate blocks (in which each of M, N, L, m is a natural number, L is not less than N and m is not less than 2), and said each of said first and second correlation degree operation apparatus comprises:

a search area memory for storing the picture element data of a search area including ((m×M)×L) candidate blocks; and a correlation degree operation unit for holding the picture element data of a reference picture block having (M×N) picture elements and executing an operation of a degree of correlation between said reference picture block and each of said candidate blocks, with the use of said held picture element data of said reference picture block and the picture element data of each candidate block supplied from said search area memory, said operation being executed by a pipeline process for each candidate block group composed of (M×L) candidate blocks, said search area memory having the function of supplying, to said correlation degree operation unit at the same clock cycle, both the picture element data required for an operation of correlation degree for one candidate block group and the picture element data required for an operation of correlation degree for another candidate block group to be executed subsequently to said first-mentioned operation for said one candidate block group, said correlation degree operation unit being arranged to continuously execute the operations for said candidate block groups.

26. A correlation degree operation method of operating, according to a block matching method a degree of correlation between a reference picture block having (M×N) picture elements and each of ((m×M)×L) candidate blocks (in which each of M, N, L, m is a natural number, L is not less than N and m is not less than 2), comprising:

dividing ((m×M)×L) candidate blocks into m candidate block groups each composed of (M×L) candidate blocks, said m candidate block groups are continuously arranged to overlap one another in one of a horizontal direction and a vertical direction;

executing, on each candidate block group, an operation of repeating, L times in the other direction than the direction in which said m candidate block groups overlap, a step of applying a block-matching process to a reference picture block with respect to each of M candidate blocks arranged to continuously overlap one another in said one direction, wherein there are used, at the same clock cycle, both the picture element data required for an operation of correlation degree for one candidate block group and the picture element data required for an operation of correlation degree for another candidate block group to be executed subsequently to said first-mentioned operation for said one candidate block group.

* * * * *